United States Patent
Raman et al.

(10) Patent No.: US 11,321,303 B2
(45) Date of Patent: May 3, 2022

(54) CONFLICT RESOLUTION FOR MULTI-MASTER DISTRIBUTED DATABASES

(71) Applicant: Microsoft Technology Licensing, LLC, Redmond, WA (US)

(72) Inventors: Karthik Raman, Sammamish, WA (US); Momin Mahmoud Al-Ghosien, Sammamish, WA (US); Bhalakumaaran Erode Ranganathan, Bellevue, WA (US); Madhan Gajendran, Bengaluru (IN); Ji Huang, Bothell, WA (US); Atul Katiyar, Sammamish, WA (US); Mikhail Mikhailovich Koltachev, Redmond, WA (US); Sujit Vattathil Kuruvilla, Redmond, WA (US); Digvijaysinh Govindbhai Makwana, San Francisco, CA (US); Subramanyam Pattipaka, Bellevue, WA (US); Ovidiu Constantin Platon, Redmond, WA (US); Ankur Savailal Shah, Redmond, WA (US); Pankaj Sharma, Kirkland, WA (US); Dharma Shukla, Bellevue, WA (US); Shreshth Singhal, Seattle, WA (US); Shireesh Kumar Thota, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 582 days.

(21) Appl. No.: 16/207,170

(22) Filed: Dec. 2, 2018

(65) Prior Publication Data

US 2019/0340166 A1 Nov. 7, 2019

Related U.S. Application Data

(60) Provisional application No. 62/668,226, filed on May 7, 2018.

(51) Int. Cl.
*G06F 16/23* (2019.01)
*G06F 16/21* (2019.01)
(Continued)

(52) U.S. Cl.
CPC ........ *G06F 16/2365* (2019.01); *G06F 9/5077* (2013.01); *G06F 11/2007* (2013.01);
(Continued)

(58) Field of Classification Search
None
See application file for complete search history.

(56) References Cited

U.S. PATENT DOCUMENTS

| | | | |
|---|---|---|---|
| 5,446,880 | A | 8/1995 | Balgeman et al. |
| 5,581,753 | A | 12/1996 | Terry et al. |

(Continued)

FOREIGN PATENT DOCUMENTS

| | | |
|---|---|---|
| CN | 102497410 A | 6/2012 |
| CN | 104935672 A | 9/2015 |

(Continued)

OTHER PUBLICATIONS

"Final Office Action Issued in U.S. Appl. No. 15/991,632", dated May 19, 2020, 22 Pages.

(Continued)

*Primary Examiner* — Giuseppi Giuliani
(74) *Attorney, Agent, or Firm* — Ray Quinney & Nebeker P.C; James Bullough

(57) ABSTRACT

Data services are often provided with various performance guarantees. Multi-master architectures, in which multiple master servers are permitted to update a portion of the data set, may facilitate some performance requirements, but may also lead to data version conflicts in which different masters have written different versions of one or more data items. Moreover, conflicts involving different data items may have (Continued)

to be resolved using different conflict resolution techniques. Therefore, various data items of the data set may be associated with a conflict resolution technique selected from a conflict resolution technique set, such as manual conflict resolution; a write order policy, such as last writer wins; a conflict resolution logic; and conflict resolution based on data types. A data version conflict may be resolved by identifying and invoking the selected conflict resolution technique that is associated with the data item, and applying the conflict resolution outcome to the data item.

19 Claims, 10 Drawing Sheets

(51) Int. Cl.
| G06F 16/27 | (2019.01) |
| G06F 11/20 | (2006.01) |
| G06F 16/22 | (2019.01) |
| G06F 16/2452 | (2019.01) |
| G06F 16/28 | (2019.01) |
| G06F 16/25 | (2019.01) |
| G06F 9/50 | (2006.01) |
| G06F 16/182 | (2019.01) |
| G06F 16/903 | (2019.01) |
| H04L 67/1008 | (2022.01) |
| H04L 41/0896 | (2022.01) |
| H04L 41/5009 | (2022.01) |
| H04L 47/72 | (2022.01) |
| H04L 47/762 | (2022.01) |
| H04L 41/5019 | (2022.01) |
| H04L 67/1012 | (2022.01) |
| H04L 67/1034 | (2022.01) |
| H04L 41/0803 | (2022.01) |
| H04L 41/5022 | (2022.01) |
| H04L 41/50 | (2022.01) |
| H04L 69/24 | (2022.01) |
| H04L 29/08 | (2006.01) |
| H04L 12/24 | (2006.01) |
| H04L 12/911 | (2013.01) |
| H04L 12/923 | (2013.01) |
| H04L 29/06 | (2006.01) |
| H04L 67/1029 | (2022.01) |

(52) U.S. Cl.
CPC ...... *G06F 11/2023* (2013.01); *G06F 11/2056* (2013.01); *G06F 16/184* (2019.01); *G06F 16/211* (2019.01); *G06F 16/219* (2019.01); *G06F 16/2246* (2019.01); *G06F 16/2255* (2019.01); *G06F 16/2272* (2019.01); *G06F 16/2315* (2019.01); *G06F 16/2322* (2019.01); *G06F 16/2329* (2019.01); *G06F 16/2336* (2019.01); *G06F 16/2452* (2019.01); *G06F 16/252* (2019.01); *G06F 16/258* (2019.01); *G06F 16/27* (2019.01); *G06F 16/28* (2019.01); *G06F 16/903* (2019.01); *H04L 41/0803* (2013.01); *H04L 41/0896* (2013.01); *H04L 41/5009* (2013.01); *H04L 41/5019* (2013.01); *H04L 41/5022* (2013.01); *H04L 41/5032* (2013.01); *H04L 47/72* (2013.01); *H04L 47/762* (2013.01); *H04L 67/1008* (2013.01); *H04L 67/1012* (2013.01); *H04L 67/1034* (2013.01); *H04L 69/24* (2013.01); *G06F 2201/80* (2013.01); *H04L 67/1029* (2013.01)

(56) References Cited

U.S. PATENT DOCUMENTS

| | | | |
|---|---|---|---|
| 5,581,754 A | 12/1996 | Terry et al. | |
| 5,787,262 A | 7/1998 | Shakib et al. | |
| 5,806,074 A * | 9/1998 | Souder | G06F 11/2035 |
| 5,923,850 A | 7/1999 | Barroux | |
| 6,523,032 B1 | 2/2003 | Sunkara et al. | |
| 6,535,874 B2 | 3/2003 | Purcell | |
| 6,925,457 B2 | 8/2005 | Britton et al. | |
| 7,117,221 B2 | 10/2006 | Hahn et al. | |
| 7,269,648 B1 | 9/2007 | Krishnan et al. | |
| 7,509,354 B2 | 3/2009 | McGarvey | |
| 7,606,838 B2 | 10/2009 | Tobies | |
| 7,689,599 B1 | 3/2010 | Shah et al. | |
| 7,751,331 B1 | 7/2010 | Blair et al. | |
| 7,774,473 B2 | 8/2010 | Elving et al. | |
| 7,877,644 B2 | 1/2011 | Stenzel | |
| 8,311,981 B2 | 11/2012 | Braginsky et al. | |
| 8,326,807 B2 | 12/2012 | Aiyer et al. | |
| 8,386,421 B2 | 2/2013 | Reid et al. | |
| 8,392,482 B1 | 3/2013 | McAlister et al. | |
| 8,572,022 B2 | 10/2013 | Hagan et al. | |
| 8,595,267 B2 | 11/2013 | Sivasubramanian et al. | |
| 8,694,639 B1 | 4/2014 | Vermeulen et al. | |
| 8,719,313 B2 | 5/2014 | Swett et al. | |
| 8,745,127 B2 | 6/2014 | Gopal et al. | |
| 8,824,286 B2 | 9/2014 | Lee et al. | |
| 8,862,588 B1 | 10/2014 | Gay et al. | |
| 8,880,508 B2 | 11/2014 | Jeong et al. | |
| 8,943,180 B1 | 1/2015 | Petit-Huguenin | |
| 8,972,491 B2 | 3/2015 | Abu-Libdeh et al. | |
| 9,026,493 B1 | 5/2015 | Weng | |
| 9,195,725 B2 | 11/2015 | Brown et al. | |
| 9,219,686 B2 | 12/2015 | Hilt et al. | |
| 9,225,770 B2 | 12/2015 | Wang et al. | |
| 9,230,040 B2 | 1/2016 | Shukla et al. | |
| 9,244,926 B2 | 1/2016 | Kakivaya et al. | |
| 9,292,566 B2 | 3/2016 | Golab et al. | |
| 9,356,793 B1 | 5/2016 | Drobychev et al. | |
| 9,405,474 B2 | 8/2016 | Shukla et al. | |
| 9,411,873 B2 | 8/2016 | Rath et al. | |
| 9,460,129 B2 | 10/2016 | Mann | |
| 9,462,427 B2 | 10/2016 | Patel et al. | |
| 9,471,711 B2 | 10/2016 | Abadi et al. | |
| 9,569,513 B1 | 2/2017 | Vig et al. | |
| 9,619,261 B2 | 4/2017 | Gaurav et al. | |
| 9,632,828 B1 | 4/2017 | Mehta et al. | |
| 9,645,835 B2 | 5/2017 | Phillips et al. | |
| 9,781,124 B2 | 10/2017 | Goldberg et al. | |
| 9,888,067 B1 | 2/2018 | Yemini et al. | |
| 10,521,311 B1 | 12/2019 | Greenwood et al. | |
| 10,552,443 B1 | 2/2020 | Wu et al. | |
| 2002/0035642 A1 | 3/2002 | Clarke et al. | |
| 2002/0161757 A1 | 10/2002 | Mock et al. | |
| 2003/0037283 A1 | 2/2003 | Srinivasan et al. | |
| 2003/0046396 A1 | 3/2003 | Richter et al. | |
| 2003/0135643 A1 | 6/2003 | Chiu et al. | |
| 2003/0220966 A1 | 11/2003 | Hepper et al. | |
| 2004/0230571 A1 | 11/2004 | Robertson | |
| 2004/0230619 A1 | 11/2004 | Blanco et al. | |
| 2004/0236801 A1 | 11/2004 | Borden et al. | |
| 2005/0015436 A1 | 1/2005 | Singh et al. | |
| 2005/0044530 A1 | 2/2005 | Novik et al. | |
| 2005/0138170 A1 | 6/2005 | Cherkasova et al. | |
| 2005/0160133 A1 | 7/2005 | Greenlee et al. | |
| 2006/0106879 A1 | 5/2006 | Zondervan et al. | |
| 2006/0155945 A1 | 7/2006 | Mcgarvey | |
| 2006/0224773 A1 | 10/2006 | Degenaro et al. | |
| 2006/0282836 A1 | 12/2006 | Barker | |
| 2007/0073675 A1 | 3/2007 | Kaar et al. | |
| 2008/0147627 A1 | 6/2008 | Natkovich et al. | |
| 2008/0301025 A1 | 12/2008 | Boss et al. | |
| 2009/0248737 A1 | 10/2009 | Shukla et al. | |
| 2010/0076939 A1 | 3/2010 | Iwaki et al. | |
| 2010/0082630 A1 | 4/2010 | Zagelow et al. | |
| 2010/0094838 A1 | 4/2010 | Kozak | |
| 2011/0149743 A1 | 6/2011 | Agarwal et al. | |

(56) References Cited

U.S. PATENT DOCUMENTS

| | | |
|---|---|---|
| 2011/0258483 A1 | 10/2011 | Elson et al. |
| 2012/0136839 A1 | 5/2012 | Eberlein et al. |
| 2012/0185444 A1 | 7/2012 | Sparkes et al. |
| 2013/0064110 A1 | 3/2013 | Polinati et al. |
| 2013/0159253 A1 | 6/2013 | Dewall et al. |
| 2013/0232153 A1 | 9/2013 | Dhuse et al. |
| 2013/0254164 A1 | 9/2013 | Tsofi et al. |
| 2014/0052761 A1 | 2/2014 | Teitelbaum |
| 2014/0101298 A1 | 4/2014 | Shukla et al. |
| 2014/0195514 A1 | 7/2014 | Stein |
| 2014/0279844 A1 | 9/2014 | Shukla et al. |
| 2014/0289382 A1* | 9/2014 | Chan ................. G06F 16/16 709/221 |
| 2014/0297776 A1 | 10/2014 | Volvovski et al. |
| 2014/0304371 A1 | 10/2014 | Mraz et al. |
| 2014/0359348 A1 | 12/2014 | Volvovski et al. |
| 2015/0026189 A1 | 1/2015 | Li et al. |
| 2015/0154074 A1 | 6/2015 | Resch et al. |
| 2015/0195162 A1 | 7/2015 | Gandham et al. |
| 2015/0199134 A1* | 7/2015 | Mondal ................ G11C 7/1075 711/105 |
| 2015/0269239 A1 | 9/2015 | Swift et al. |
| 2015/0304983 A1 | 10/2015 | Krening et al. |
| 2016/0034433 A1 | 2/2016 | Yamat et al. |
| 2016/0321588 A1 | 11/2016 | Das et al. |
| 2016/0342645 A1 | 11/2016 | Tempero et al. |
| 2017/0068713 A1 | 3/2017 | Joshi et al. |
| 2017/0123948 A1 | 5/2017 | Dhuse et al. |
| 2017/0199770 A1 | 7/2017 | Peteva et al. |
| 2017/0201597 A1 | 7/2017 | Narasimhan et al. |
| 2017/0220651 A1 | 8/2017 | Mathew et al. |
| 2017/0286180 A1 | 10/2017 | He et al. |
| 2017/0293540 A1 | 10/2017 | Mehta et al. |
| 2017/0308562 A1 | 10/2017 | Sreekantaiah et al. |
| 2017/0308601 A1 | 10/2017 | Massarenti et al. |
| 2017/0318085 A1 | 11/2017 | Shukla et al. |
| 2017/0364345 A1 | 12/2017 | Fontoura et al. |
| 2018/0150331 A1 | 5/2018 | Chen et al. |
| 2018/0189369 A1* | 7/2018 | Baek ................. G06F 16/27 |
| 2018/0316752 A1 | 11/2018 | Hodges et al. |
| 2019/0050216 A1 | 2/2019 | Brundidge et al. |
| 2019/0163391 A1 | 5/2019 | Annamalai et al. |
| 2019/0166019 A1 | 5/2019 | Jagadeesh |
| 2019/0171737 A1 | 6/2019 | Duan et al. |
| 2019/0196878 A1 | 6/2019 | Li |
| 2019/0340166 A1 | 11/2019 | Raman et al. |
| 2019/0340168 A1 | 11/2019 | Raman et al. |
| 2019/0340265 A1 | 11/2019 | Raman et al. |
| 2019/0340273 A1 | 11/2019 | Raman et al. |
| 2019/0340291 A1 | 11/2019 | Raman et al. |
| 2019/0342188 A1 | 11/2019 | Raman et al. |
| 2019/0342379 A1 | 11/2019 | Shukla et al. |
| 2019/0342380 A1 | 11/2019 | Thota et al. |
| 2020/0117748 A1 | 4/2020 | Gupte et al. |

FOREIGN PATENT DOCUMENTS

| | | |
|---|---|---|
| WO | 9735270 A1 | 9/1997 |
| WO | 2008100795 A1 | 8/2008 |
| WO | 2010048595 A2 | 4/2010 |

OTHER PUBLICATIONS

"Non-Final Office Action Issued in U.S. Appl. No. 15/991,786", dated May 8, 2020, 36 Pages.

"Non-Final Office Action Issued in U.S. Appl. No. 15/991,880", dated Jun. 10, 2020, 37 Pages.

Buckler, Craig, "How to Convert XML to a JSON-Like JavaScript Object", Retrieved From: http://www.sitepoint.com/how-to-convert-xml-to-a-javascript-object, Oct. 20, 2011, 9 Pages.

Chan, et al., "Taming XPath Queries by Minimizing Wildcard Steps", In Proceedings of the 30th VLDB Conference, Aug. 31, 2004, pp. 156-167.

He, et al., "Query Language and Access Methods for Graph Databases", In Book Managing and Mining Graph Data, 2010, pp. 125-160.

Kossmann, Donald, "The State of the Art in Distributed Query Processing", In ACM Computing Surveys, vol. 32, No. 4, Dec. 2000, pp. 422-469.

Kraska, et al., "Consistency Rationing in the Cloud: Pay only when it Matters", In Proceedings of the Very Large Data Bases Endowment, vol. 2, Issue 1, Aug. 24, 2009, 12 Pages.

Lim, et al., "Automated Control for Elastic Storage", In Proceedings of the 7th International Conference on Autonomic Computing, Jun. 7, 2010, pp. 1-10.

Moon, et al., "Introducing SSDs to the Hadoop MapReduce Framework", In Proceedings of 7th International Conference on Cloud Computing, Jun. 27, 2014, pp. 272-279.

Xue, et al., "COMET: Client-Oriented Metadata Servcie for Highly Available Distributed File Systems", In Proceedings of 27th International Symposium on Computer Architecture and High Performance Computing (SBAC-PAD), Oct. 17, 2015, pp. 154-161.

"International Search Report and Written Opinion Issued in PCT Application No. PCT/US2019/031207", dated Jul. 19, 2019, 13 Pages.

"International Search Report and Written Opinion Issued in PCT Application No. PCT/US2019/031204", dated Jul. 19, 2019, 14 Pages.

"International Search Report and Written Opinion Issued in PCT Application No. PCT/US2019/031208", dated Jul. 24, 2019, 15 Pages.

"Non Final Office Action Issued in U.S. Appl. No. 15/991,953", dated Aug. 22, 2019, 21 Pages.

"Notice of Allowance Issued in U.S. Appl. No. 15/991,632", dated Dec. 10, 2020, 10 Pages.

"Final Office Action Issued in U.S. Appl. No. 15/991,786", dated Oct. 23, 2020, 16 Pages.

"Non Final Office Action Issued in U.S. Appl. No. 15/991,632", dated Jan. 24, 2020, 23 Pages.

"Final Office Action Issued in U.S. Appl. No. 15/991,953", dated Feb. 14, 2020, 24 Pages.

Likness, Jeremy, "Getting Behind the 9-Ball: Cosmos DB Consistency Levels Explained", Retrieved From: https://blog.jeremylikness.com/blog/2018-03-23_getting-behind-the-9ball-cosmosdb-consistency-levels/, Mar. 23, 2018, 8 Pages.

Montazerolghaem, et al., "Overload Control in SIP Networks: A Heuristic Approach based on Mathematical Optimization", In Proceedings of Global Communications Conference (GLOBECOM), Dec. 6, 2015, 6 Pages.

"Conflict Resolution", Retreived from https://web.archive.org/web/20120402192233/https://docs.oracle.com/cd/E11882_01/server.112/e10706/repconflicts.htm, Apr. 2, 2012, 28 Pages.

"Conflict Resolution", Retrieved from https://docs.oracle.com/cd/F49540_01/DOC/server.815/a67791/ch6.htm, Retrieved Date: Aug. 31, 2018, 43 Pages.

"Conflict Resolution Concepts and Architecture", Retrieved from https://docs.oracle.com/cd/B10500_01/server.920/a96567/repconflicts.htm, Nov. 15, 2011, 35 Pages.

"Couchbase Server: Schemaless Data Modeling", Retrieved from https://developer.couchbase.com/documentation/server/3.x/developer/dev-guide-3.0/schemaless.html, Retrieved Date: Nov. 20, 2017, 5 Pages.

"Lotus Notes/Domino Replication Conflict Solver", Retrieved from https://web.archive.org/web/20100306134644/http://www.ytria.com/WebSite.nsf/WebPageRequest/Solutions_scanEZ_ConflictSolveren, Dec. 15, 2005, 2 Pages.

"Master Replication Concepts and Architecture", Retrieved from https://docs.oracle.com/cd/B10501_01/server.920/a96567/repmaster.htm, Feb. 17, 2012, 40 Pages.

"Master-master vs Master-slave Database Architecture?", Retrieved from https://stackoverflow.com/questions/3736969/master-master-vs-master-slave-database-architecture, Retrieved Date: Jul. 2, 2018, 8 Pages.

(56) References Cited

OTHER PUBLICATIONS

"Master-to-Slave Replication", Retrieved from https://www.ibm.com/support/knowledgecenter/en/POWER8/p8ha1/example2mastertoslavereplication.htm, Retrieved Date: Jul. 3, 2018, 4 Pages.

"Replica Set Elections", Retrieved from https://docs.mongodb.com/manual/core/replica-set-elections/, Retrieved Date: Jul. 2, 2018, 6 Pages.

Afriansyah, et al., "Model of Load Balancing Using Reliable Algorithm With Multi-Agent System", In Journal of IOP Conference Series: Materials Science and Engineering, vol. 190, Issue 1, Apr. 2017, 9 Pages.

Ardagna, et al., "SLA Based Resource Allocation Policies in Autonomic Environments", In Journal of Parallel and Distributed Computing, vol. 67, Issue 3, Mar. 1, 2007, pp. 259-270.

Fernandez, et al., "Autoscaling Web Applications in Heterogeneous Cloud Infrastructures", In Proceedings of IEEE International Conference on Cloud Engineering, Mar. 11, 2014, 11 Pages.

Gunda, et al., "Multi-master at global scale with Azure Cosmos DB", Retrieved from https://docs.microsoft.com/en-us/azure/cosmos-db/multi-region-writers, May 7, 2018, 9 Pages.

Liu, et al., "Consistency as a Service: Auditing Cloud Consistency", In Journal of IEEE Transactions on Network and Service Management, vol. 11, Issue 1, Mar. 2014, pp. 25-35.

Masha, et al., "Implement a Custom Conflict Resolver for a Merge Article", Retrieved from https://docs.microsoft.com/en-us/sql/relational-databases/replication/implement-a-custom-conflict-resolver-for-a-merge-article?view=sql-server-2017, Mar. 14, 2017, 6 Pages.

Patra, Chandan, "How to Use Consistency Models for Amazon Web Services", Retrieved from https://cloudacademy.com/blog/consistency-models-of-amazon-cloud-services/, Jun. 3, 2016, 9 Pages.

Shukla, et al., "Schema-Agnostic Indexing with Azure DocumentDB", In Proceedings of 41st International Conference on Very Large Data Bases, vol. 8, Issue 12, Aug. 1, 2015, pp. 1668-1679.

Singh, et al., "Server-Storage Virtualization: Integration and Load Balancing in Data Centers", In Proceedings of ACM/IEEE Conference on Supercomputing, Nov. 15, 2008, 12 Pages.

Thomsen, Jakob Holdgaard, "UBER Engineering: The Architecture of Schemaless, Uber Engineering's Trip Datastore Using MySQL", Retrieved from https://eng.uber.com/schemaless-part-two/, Jan. 15, 2016, 8 Pages.

"Non Final Office Action Issued in U.S. Appl. No. 15/991,953", dated Jul. 16, 2020, 24 Pages.

"Notice of Allowance Issued in U.S. Appl. No. 15/991,062", dated Mar. 18, 2020, 9 Pages.

"Non Final Office Action Issued in U.S. Appl. No. 15/991,223", dated Apr. 9, 2020, 15 Pages.

"Non Final Office Action Issued in U.S. Appl. No. 16/209,647", dated May 25, 2021, 15 Pages.

"Non Final Office Action Issued in U.S. Appl. No. 16/207,176", dated Jun. 4, 2021, 14 Pages.

"Final Office Action Issued in U.S. Appl. No. 16/207,176", dated Nov. 1, 2021, 24 Pages.

"Final Office Action Issued in U.S. Appl. No. 16/209,647", dated Nov. 17, 2021, 13 Pages.

\* cited by examiner

CONFLICT RESOLUTION FOR MULTI-MASTER DISTRIBUTED DATABASES

CROSS-REFERENCE TO RELATED APPLICATIONS

This application is a continuation-in-part of, and claims priority under 35 U.S.C. §§ 119 and/or 120 to, U.S. Patent Application No. 62/668,226, entitled "Distributed Databases," filed on May 7, 2018, the entirety of which is hereby incorporated by reference as if fully rewritten herein.

ORGANIZATION OF DISCLOSURE

The present disclosure is organized as follows:

| | | |
|---|---|---|
| Background | | [0003]-[0004] |
| Summary | | [0005]-[0014] |
| Description of the Drawings | | [0015]-[0024] |
| Detailed Description | | [0025]-[0162] |
| A. | Introduction | [0026]-[0042] |
| B. | Presented Techniques | [0043]-[0052] |
| C. | Technical Effects | [0053]-[0058] |
| D. | Example Embodiments | [0059]-[0067] |
| E. | Variations | [0068]-[0143] |
| E1. | Scenarios | [0070]-[0072] |
| E2. | Data Version Conflict Resolution | [0073]-[0104] |
| E2A. | Manual Conflict Resolution | [0080]-[0082] |
| E2B. | Write Priority Conflict Resolution | [0083]-[0087] |
| E2C. | Stored Conflict Resolution Logic | [0088]-[0096] |
| E2D. | Data Type Conflict Resolution | [0097]-[0104] |
| E3. | Associations | [0105]-[0122] |
| E4. | Detecting Data Version Conflicts | [0123]-[0130] |
| E5. | Resolving Data Version Conflicts | [0131]-[0143] |
| F. | Example Computing Environment | [0144]-[0154] |
| G. | Usage of Terms | [0155]-[0162] |

BACKGROUND

Within the field of computing, many scenarios involve a distributed data service that processes data on behalf of various workloads. In such scenarios, the workloads are often constrained by a set of performance requirements, such as low latency, high availability, scalability to accommodate surges in demand, and/or consistency guarantees of various types and levels. The performance requirements for respective workloads are often formalized in a service level agreement, whereby the provider of the distributed data service provides a guarantee that the distributed data service will satisfy the performance requirements of the workload.

The distributed data services are often configured to perform load-balancing of the workloads to satisfy the performance requirements with an efficient allocation of computing resources while upholding performance guarantees provided in service level agreements. A notable technique for maintaining a consistency guarantee for a workload involves the identification, among the distributed servers that process the workload, of a single master that is permitted to update the stored data of the workload. By limiting the updates to a single master, the distributed data service avoids the potential of data conflicts that might arise from writing data at multiple locations. The identification of a single master may also provide other advantages, such as a determinable upper bound on the delay in propagating updates across all of the other servers that process the workload, based on the calculable propagation delay from the master server to every other server. As another example, it may be advantageous to choose, as the single master, a server that is in proximity to an anticipated source of the updates, e.g., in order to reduce network transport delays and latency.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The designation of a single master as the sole server in the distributed data service that is permitted to alter the data of a workload may provide some advantages, but may also incur some disadvantages that may be significant for some workloads. As a first example, the single master may present a performance bottleneck; e.g., if updates arrive at a faster rate than the master can process, updates may be unavoidably delayed. As a second example, latency not be reducible to a desired level, due to the propagation delays of the single master to the entire data set. For particularly latency-sensitive workloads, it may not be possible to identify any server as the single master that is capable of propagating updates over the entire distributed data set, because the rate of update propagation from a single server is unavoidably limited by the speed of light and the maximum achievable transmission rates of contemporary networking equipment. As a third example, the designation of a single server as the sole source of updates may create a single point of failure; e.g., if the single-master server encounters a failure or a network partition, all capability of reliable updates to the data set may have to be postponed until a substitute server is selected, provisioned, and ready to take over as a substitute single master.

In order to alleviate the limitations of a single-master configuration of the data service, it may be desirable to permit the designation of multiple masters that are permitted to update the data set of a workload. While such designation may enable advances in the properties noted above (e.g., latency reduction, scalability, and availability), the designation of multiple masters may raise the prospect of data versioning conflicts, which, if undetected and unhandled, may compromise the integrity and logical validity of the entire data set.

Even in multi-master configurations, the occurrence of a data version conflict may be precluded where a master receives, from a client or a workload, a request that is inconsistent with the current state of the data set (e.g., a request to change an integer from a value 3 to a value of 5, when the server set has established a consensus that the current value of the integer is not 3 but rather 6). Such uncommitted requests may be rejected by the master, thus preventing the occurrence of a data version conflict involving the data item, and may therefore not necessitate the invocation of a data version conflict resolution technique in accordance with the present disclosure. More generally, a sequence of updates streaming initiated with a single master may be unlikely to raise a data version conflict, as the single master may choose to commit or reject each update in view of the established state of the data set, including the commitment of preceding updates. Rather, data version conflicts described herein typically arise when two or more masters accept, and in some cases commit, updates of one or more data items, where the coexistence of such updates creates a disagreement within the server set as to the state of the data set. For example, a data item comprising an integer may have an initial state of 3, and a first master may accept an update of the value of the integer from 3 to 5 while a second master accepts an update of the value of the integer from 3 to 6. Each master may be unaware of the conflicting update accepted by the other master; e.g., in widely distributed databases, conditioning the acceptance of an update on verifying the unanimity of the server set as to the current value of the integer may unduly diminish the performance of the server set. In the absence of such unanimity, conflicting updates of a data item may be accepted by different masters, and the incidence of a data conflict may be discovered later, such as when the updates propagate throughout the data set to other master and non-master servers.

Some data versioning conflicts may be resolvable by permitting respective masters to apply a conflict resolution technique, such as notifying an administrator of the workload for manual resolution; an automated resolution policy, such as first writer wins or last writer wins; or a stored procedure that provides a logic for resolving conflicts. However, such techniques may also present some disadvantages. As a first such example, various workloads that are executed by the distributed data service may involve a diverse and complex set of data items, and it may not be viable to select a particular technique as a "one-size-fits-all" conflict resolution process for all workloads. Indeed, some workloads may require different conflict resolution techniques for different types of data. As a second such example, while it may be possible to ask an administrator to address data version conflicts, such manual and/or user-driven resolution may not be viable in some cases, e.g., where the data set is rapidly evolving such that the administrator is incapable or unwilling to service all data version conflicts, and/or where the data of the data service is at least partly defined by third parties in a manner that prevents the administrator from a full understanding of the data semantics that may be necessary to resolve data version conflicts. As a third such example, different servers may discover and resolve a particular data version conflict, but if the data version conflict resolution consumes significant computational resources, concurrent conflict evaluation and resolution by multiple masters may incur redundant processing that diverts computational resources from more productive uses. As a fourth such example, different servers may discover and resolve a particular data conflict, but may do so using different data conflict policies—leading to a continuation, or even exacerbation, of the data version conflict. Because each master server may believe that it has successfully resolved the data version conflict, the divergence of the data set may not be discovered until significantly later, at which point rollback to reconcile the choices to a single conflict resolution may be computationally expensive or even impossible.

Presented herein are techniques for providing a distributed data service in a manner that permits multiple masters to update a data set while reducing the incidence of conflict, the application of an unsuitable data version conflict resolution technique to a data set, and the performance characteristics of the distributed data service that are determinative of guarantees such as latency, scalability, and/or availability.

A first example embodiment of the currently presented techniques comprises a server for a data set. The server comprises a processor and a memory storing instructions that, when executed by the processor, cause the server to associate respective portions of the data set with a conflict resolution technique selected from a conflict resolution technique set. Execution of the instructions further causes the processor to detect, in at least one data item of the data set, a data version conflict. Execution of the instructions further causes the processor to resolve the data version conflict, comprising at least two versions of a selected data item, by identifying a selected conflict resolution technique that is associated with a selected portion of the data set comprising the data item; invoking the selected conflict resolution technique with the at least one data item to generate a conflict resolution outcome; and applying the conflict resolution outcome to the data set.

A second example embodiment of the currently presented techniques comprises a method of configuring a server of a server set to process a data set. The method comprises executing, by a processor of the server, instructions that cause the server to associate respective portions of the data set with a conflict resolution technique selected from a conflict resolution technique set. The method further comprises executing instructions that cause the server to detect, in at least one data item of the data set, a data version conflict. The method further comprises executing instructions that cause the server to resolve the data version conflict by identifying a selected conflict resolution technique that is associated with a selected portion of the data set comprising the data item; invoking the selected conflict resolution technique with the at least one data item to generate a conflict resolution outcome; and applying the conflict resolution outcome to the data set.

A third example embodiment of the currently presented techniques comprises a method of causing a server of a server set to processing a workload of a data set. The method comprises executing, by a processor of the server, instructions that cause the server to detect a data version conflict in at least one data item of the data set, the data version conflict comprising a first update of the at least one data item by a first master of the server set and a second update of the at least one data item by a second master of the server set, wherein coexistence of the first update and the second update cause the data version conflict. The method further comprises executing instructions that cause the server to identify, from a conflict resolution technique set, a selected conflict resolution technique that is associated with the at least one data item the data set. The method further comprises executing instructions that cause the server to invoke the selected conflict resolution technique with the first update and the second update to generate a conflict resolution outcome. The method further comprises executing instructions that cause the server to apply the conflict resolution outcome to the data set to resolve the data version conflict in the at least one data item.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
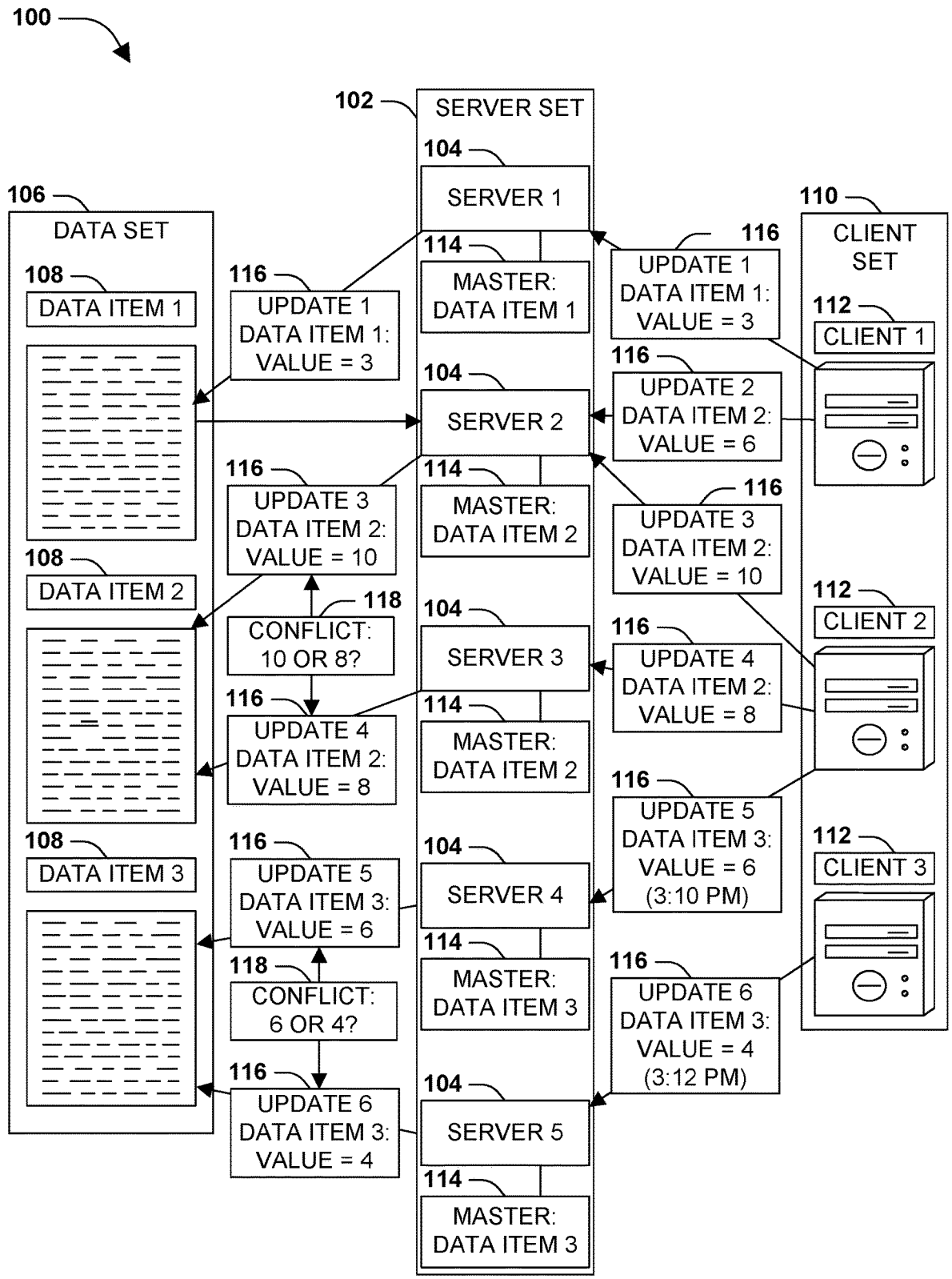
FIG. 1 is an illustration of an example scenario featuring a multi-master database that applies updates to a data set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. INTRODUCTION

Modern data services are often distributed over a set of servers in various ways, ranging from local distribution within a rack, server room, building, or campus to regional distribution over a set of cities, countries, or continents. Data services are often provided to process a set of workloads from one or more clients, such as databases that are targeted by a volume of queries.

The workloads may serve a variety of data-driven applications that have different constraints. Some workloads may serve applications that are time-sensitive, where responsiveness is a significant requirement of the workload; accordingly, the data service may have to service such workloads in a manner that maintains a low latency, such as a response time within five milliseconds for 99% of read requests and a response time within ten milliseconds for 99% of write requests. A variety of server architecture configurations may be utilized to satisfy this performance requirement, such as allocating servers for such workloads that are proximate to the source of the requests (e.g., provisioning servers for a local news server that are close to a source and/or a demand for the news).

Some workloads may serve applications that are volume-sensitive, wherein a particular workload volume is anticipated (optionally with periodic fluctuation, such as higher volume during business hours, during the work week, or during traditional holiday months). It may be desirable to configure the data service architecture to ensure that the data service is capable of satisfying the anticipated workload volume at all times. Additionally, some workload may scale unexpectedly and perhaps rapidly to a greater volume of requests. It may be desirable to configure the data service with the capability to respond to workload surges by scaling up the data service within a short time frame, e.g., ensuring that a request to scale up the workload capacity that the data service has provided for the workload to a higher level can be satisfied within a matter of a few seconds. A variety of server architecture configurations may be utilized to satisfy volume and scalability performance requirements, such as maintaining a reserve of servers in various geographic regions or clusters that are available on-demand to take on a portion of the processing of the workload for the application.

Some workloads may serve applications that are availability-sensitive, wherein the vast majority of requests are to be successfully completed, and wherein an inability to satisfy a request is significantly problematic. Availability may also have to be maintained even in the event of a failure of data service resources, such as a failure of a server or a partial network outage. A variety of server architecture configurations may be utilized to satisfy volume and scalability performance requirements, such as availability verification techniques that rapidly identify an outage and automated failover techniques that rapidly initiate contingency plans in the event of network failure (e.g., automated techniques for selecting a failover server to substitute for a failed server, and for establishing a configuration of the failover server to accept a transfer of the portion of the workload that was allocated to the failed server as rapidly as possible).

Some workloads may serve applications that are consistency-sensitive, wherein data updates that are occurring in an inadequately synchronized manner may cause parts of the data set of the workload to diverge, and may cause different servers to handle an identical request in different ways due to discrepancies in the data set of the application that is stored by each server. For example, a banking service may store a record of an individual's account balance that is simultaneously updated by two different servers with two different updates. In some cases, the simultaneous updates may cause one update to be lost; in other cases, a conflict may be detected, but the servers may be unable to resolve it. Because different applications may have different sensitivities to data version conflicts, a particular workload may be governed by a particular consistency model, such as a strong consistency model where all updates are guaranteed to be strictly applied in "wall-clock" order across the entire data service; an eventual consistency model, where data sets stored by different servers may diverge, but are eventually and retrospectively reconciled to exhibit a consistent data set up to a certain time point; and a last-write-wins consistency model, wherein loss of past data updates is tolerable as long as the server set stores and provides the most recent update.

A variety of server architecture configurations may be utilized to satisfy the consistency level of a workload. For particularly conflict-sensitive workloads, the server architecture may be selected to ensure that updates are provided in a specific order by restricting all updates of the data set of the workload to a single "master" server. While all servers that service the workload may fulfill requests to read the data, any server except the master server that receives an update may forward it to the master server for processing. By serving as the single point of updates to the data set, the single master server may apply all updates in a correct order and propagate updates to the other servers of the server set. In this manner, a strong consistency level may be applied to satisfy the data version conflict sensitivity of the workload.

For any particular workload, the data server may formalize some or all of the types of performance requirements noted above—latency, throughput, availability, scalability, and consistency level—in a service level agreement. The use of a service level agreement may permit the client of a workload to specify the performance requirements of the workload and the client's expectations of the performance of the data service, and a guarantee by the providers of the data service of the performance that is to be provided and maintained by the server set for the workload. Some service level agreements may specify a collection of performance requirements, such as both a latency requirement and a consistency level. Some service level agreements may specify different performance requirements for different portions of the workload (e.g., different tasks comprising the workload, such as different types of queries that have different performance sensitivities) and/or for different contexts in which a workload is performed (e.g., different performance requirements for peak hours vs. off-hours). A data service may utilize the service level agreement to guide an administrator in selecting and provisioning a set of data service resources to satisfy the guarantees; alternatively or additionally, a data service may use the service level agreement to inform an automated process that provisions and configures data service resources to handle the workloads. Many distributed data services are multi-tenant, such that workloads of various clients are distributed over the server set, wherein a particular server may consecutively and/or concurrently perform two or more workloads on behalf of two or more clients. Such multitenancy scenarios may involve careful configuration of the servers, e.g., to prevent a first workload of a first client from observing and/or interfering with a second workload of a second client, and/or to ensure that excessive resource utilization by a first workload does not jeopardize the fulfillment of a service level agreement for a second workload.

Some workloads that are constrained by multiple performance requirements may present a tradeoff, wherein fulfilling a first performance guarantee affects the capability of the server set to fulfill a second performance guarantee. In some instances, the concurrent fulfillment of two performance guarantees may be achievable, but may considerably increase the commitment of computational resources relative to the fulfillment of either performance guarantee alone. In other instances, the concurrent fulfillment of two performance guarantees may not be reasonably achievable, or in some cases may be physically impossible with some data service architectures.

A particular example of a performance requirement tradeoff that may be difficult to fulfill is a workload that requires both low latency and a strict consistency level. The server architecture is configured to satisfy the strict consistency level through a single-master configuration in which all updates are routed to a single master server for application to the data set. However, such propagation may involve an unavoidable network transport delay, based upon technical constraints (e.g., the maximum achievable responsiveness of server and networking hardware) and/or physical constraints (e.g., maximum transmission speeds limited by the speed of light). It may therefore be difficult or even impossible to guarantee that all updates are to be committed to the data set of the workload by a single-master server architecture within a latency bound, such as ten milliseconds. For example, if updates are to be received throughout the world, and the maximum round-trip delay between any selectable server location and the furthest anticipated source of update requests may exceed the maximum desired latency, then fulfilling the strict consistency model within the specified latency bound may not be possible with any single-master configuration of the server set. Due to such constraints, distributed data services based on single-master configurations may risk violating some performance guarantees, and/or may be unable to offer certain types of service level agreements with performance guarantees that may be violated in some circumstances.

In order to alleviate the performance limitations of a single-master server architecture, a data service may offer a multi-master server architecture, in which updates may be fulfilled by two or more master servers of the server set. For instance, for each broad geographic region (e.g., Africa, Asia, Europe, and North America), a selected server may be designated as a regional master, and all updates received within a particular region may be forwarded to the regional master server for processing. In many scenarios, such architectures may avoid data version conflicts (e.g., some workloads may require that updates to a particular portion of the data set are only validly received from within a particular region that is serviced by a relatively proximate regional master server and within the latency guarantee, rather than a distant master server that would violate the latency guarantee). However, in other scenarios, such architectures may present a risk of data version conflicts, where a data item is concurrently updated in contradictory ways by different master servers.

FIG. 1 is an illustration of an example scenario 100 featuring a multi-master server set 102 for a data set 106. In this example scenario 100, the server set 102 comprises a number of servers 104 that access a data set 106, comprising a collection of data items 108, on behalf of a client set 110 of clients 112. The data set 106 and data items 108 may be structured in an organized manner (e.g., a relational database comprising a set of tables with records that may respectively reference one or more records of another table; an object graph of objects with interconnecting relationships; or a key/value store) or without organization (e.g., a collection of documents). The servers 104 may access the data set 106 on behalf of clients 112 executing a variety of workloads (e.g., data-driven applications; data mining projects; and information presentation, such as web servers), which may involve accessing the data items 108 in a variety of ways, such as read operations that only retrieve information from the data set 106 (e.g., relational SELECT queries) and updates 116 that modify a portion of the data set 106, such as creating one or more data items 108, such as inserting records into a relational table; modifying the contents of one or more data items 108, such as updating attributes of a relational table; deleting one or more data items 108, such as removing records from a relational table; and combinations of such operations, such as creating a copy of a data item 108.

As further shown in the example scenario 100 of FIG. 1, various servers 104 may be designated as a master 114 of the data set 106 or a subset thereof, where a master 114 is permitted to apply an update 116 to a selected data item 108 of the data set 106. For example, the first server 104 is designated as the master 114 for a first data item 108, and, as the sole master in the illustrated data set 102, may comprise the only server 104 that is permitted to modify the first data item 108 by applying updates 116 as requested by the clients 112. Any other server 104 may be permitted to read the first data item 108 and provide it to a client 112, but may not be permitted to apply updates 116; rather, the other servers 104 may be configured to forward any such updates to the first server 104 for application to the data first data item 108, or to refuse such updates 116. Conversely, the first server 104 may be permitted to read other data items 108, but may not be permitted to update them. By limiting the application of updates 116 of the first data item 108 to a single master 114, this single-master designation permits the first server 104 to examine the collection and sequence of updates 116 to distinguish between updates 116 that do not create a conflict 118 (which the first server 104 applies to the first data item 108) from updates 116 that potentially create a conflict 118 (which the first server 104 refrains from applying to the first data item 108). For instance, two clients 112 may request updates to different values to the first data item 108, and the first server 104 may resolve the conflict by choosing one of the updates 116 and rejecting the other update 116, or by choosing a sequence in which the updates are to be applied. By controlling the manner in which the first data item 108 is updated, the single-master server 104 may reduce the prospect of data version conflicts 118 involving the first data item 108, in which the other servers 104 disagree about the selection and ordering of the updates 116 of the first data item 108. That is, the other servers 104 do not exhibit different versions of the first data item 108 as a result of substantive and distinct discrepancies in the selection and sequencing of updates 116.

However, single-master server sets 102 may exhibit significant disadvantages, such as limitations on achievable performance factors. Due to the designation of the first server 104 as the sole master 114 for the first data item 108, all updates 116 to the data item 108 are processed by the first server 104, thus creating a performance bottleneck, which limits latency reduction and scalability, and creates a single point of failure, which limits availability (both the likelihood and consequences of hardware failure and the complexity of fault recovery).

FIG. 1 also presents, within the server set 102, the designation of the second server 104 and the third server 104 as multiple masters 114 of the second data item 108, and the designation of the fourth server 104 and the fifth server 104 as multiple masters 114 of the third data item 108, where each of the two masters 114 is permitted to apply updates 116 to the identified data item 108 on behalf of the client set 110. In both cases, the designation of multiple masters 114 may facilitate performance characteristics, such as latency, scalability, and availability. Additionally, each master 114 may resolve data version conflicts among updates 116 that arrive at the server 104; e.g., if two clients 112 submit updates 116 to the second server 104 for application to the second data item 108 (such as the second update 116 and the third update 116), the second server 104 may identify a selection and ordering of the updates 116 that preserves the versioning of the second data item 108, such as choosing to apply only the third update 116 and to reject the second update 116. However, concurrently with the second server 104 choosing to apply the third update 116, the third server 104 may receive the fourth update 116, and may choose to apply it to the second data item 108. Each of the second server 104 and the third server 104, both serving as masters 114 of the second data item 108, may not timely notify one another of the update 116 applied to the second data item 108, and may therefore disagree as to the current value of the second data item 108.

The discrepancy in the conflicting values of the second data item 108 may create a data version conflict 118, wherein different masters 114 utilize different values and versions of the second data item 108. The final value of the data item 108 after the application of the updates 116 may depend upon arbitrary factors, such as a race condition. Alternatively, the data item 108 may simply appear to have different values in different contexts. For example, the data version conflict 118 may spread to other servers 104; e.g., the second server 104 may notify the first server 104 that the value of the second data item 108 is ten, while the third server 104 may notify the fourth and fifth servers 104 that the value of the second data item 108 is eight. The data version conflict 118 may cause discrepancies in the logical performance of the workloads of the clients 112. The data version conflict 118 may not be discovered in a timely manner, during which time the data version conflict 118 may affect other data items 108 (e.g., a value of the first data item 108 may depend upon a current value of the second data item 108). As a result, retroactively correcting the data version conflict 118 may involve retroactively changing the values of other data items 108 that were also affected by the conflicting values of the second data item 108, leading to a potentially onerous, and in some cases unresolvable, inconsistency in the data set 106.

As further illustrated in the example scenario 100 of FIG. 1, the fourth and fifth servers 104 are also designated as multiple masters 114 of the third data item 108. Similar to the masters 114 for the second data item 108, the masters 114 for the third data item 108 may also receive and apply updates 116 to the third data item 108, which, if applied in an uncoordinated manner, may give rise to a data version conflict 118; e.g., the second server 104 may notify the second client 112 and the first and second servers 104 that the value of the third data item 108 is 6, while, concurrently, the fifth server 104 notifies the third server 104 and the third client 112 that the value of the third data item 108 is four. Moreover, a further complexity may arise if the semantics of updating the third data item 108 differ from those in the second data item 108. For example, consistent versioning of the second data item 108 may involve monotonically increasing values, such that a value of 8 is to be applied before a value of 10 and not vice versa. However, for the third data item 108, consistent versioning may involve applying the values in strict chronological order, e.g., according to a timestamp generated by the respective client 112, such that the update of the third data item 108 to the value 4 (accompanied by a later timestamp than the update 116 to the value 6) may represent the latest and current value of the third data item 108. In this manner, the update semantics may differ for different data items 108 of the data set 106. Even if a data version conflict 118 is identified, it may be difficult for a particular master 114 to determine the conflict resolution logic. For example, the third server 104 may be designated as a master 114 of both the second data item 108 and the third data item 108, and may have difficulty determining the distinct manner in which data version conflicts 118 are to be resolved for different data items 108 of the data set 106. In some cases, failure to honor the distinction may lead different servers 104 to disagree as to the correct resolution of a data version conflict 118, and even to resolve the data version conflict 118 in different ways, thus prolonging and/or complicating the detection and resolution of the persistent data version conflict 118. These and other problems may arise from the designation of multiple masters 114 of a data set 106.

B. PRESENTED TECHNIQUES

In view of the limitations of single-master server architectures and the potential problems with data version conflicts and/or performance guarantees that may arise with some multi-master server architectures, the present disclosure provides multi-master service configurations that may promote the extension and/or fulfillment of service level agreements with guarantees for various types of performance requirements.

Figure 2:
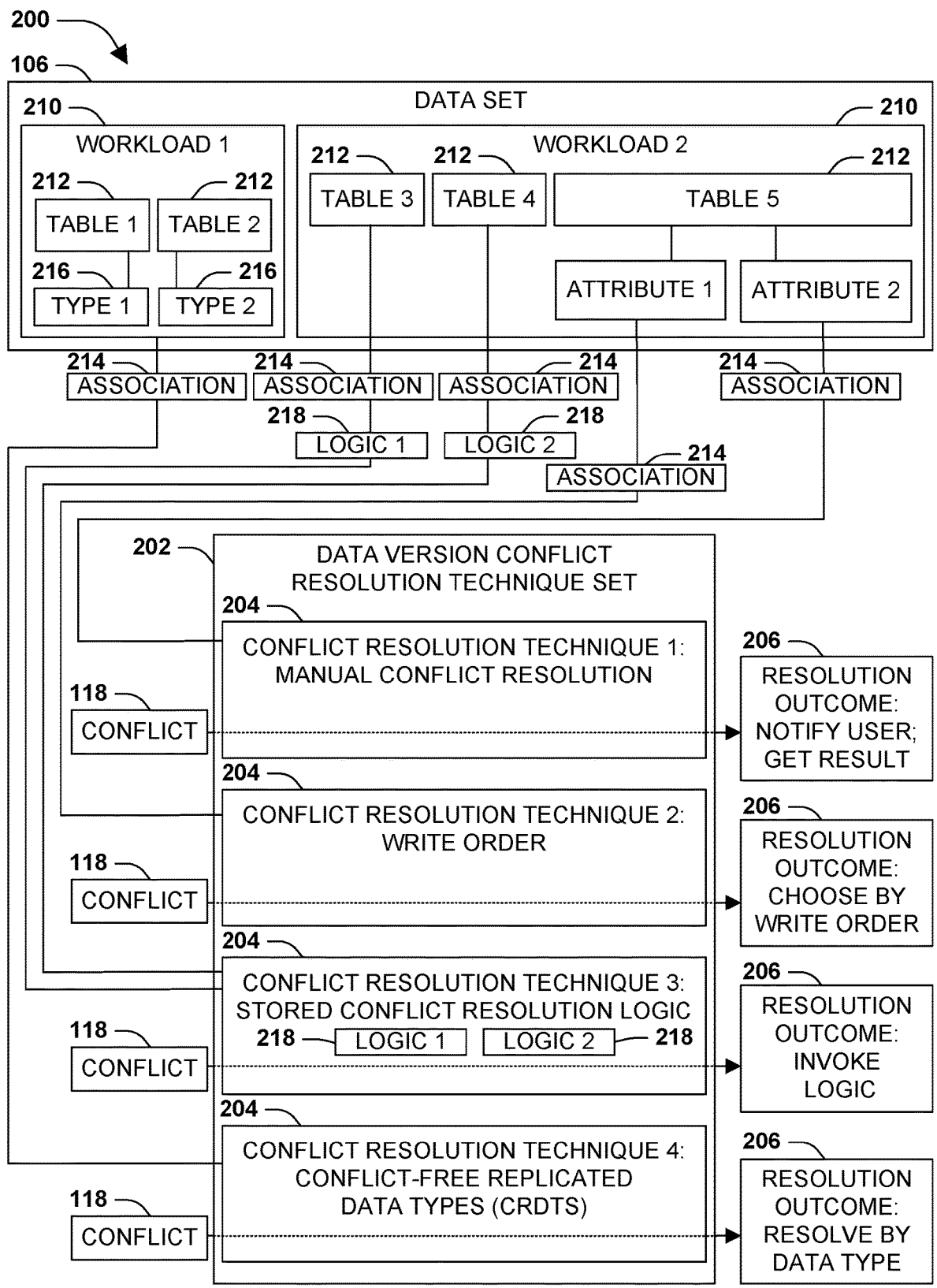
FIG. 2 is an illustration of an example scenario featuring a multi-master database that applies updates to a data set in accordance with the techniques presented herein.

FIG. 2 is an illustration of an example scenario 200 featuring a set 106 that may be provided by a multi-master server set 102, in a manner which may reduce data version conflicts 118 and facilitate the resolution thereof, in accordance with the techniques presented herein.

In this example scenario 200, a data set 106 comprises a set of data items that are provided to service various workloads 210. For example, the data set 106 may comprise a relational database comprising tables 212 that respectively comprise attributes of various types, such as integers, floating-point values, dates, strings, and media objects. A first subset of tables 212 services a first workload 210 and a second subset of tables 212 services a second workload 210 (e.g., different portions of the data set 106 may provide data for different clients 112 and/or data-driven applications).

In this example scenario 200, a server comprises a data version conflict resolution technique set 202, which includes a set of data version conflict resolution techniques 204 that may be invoked to resolve a data version conflict 118 of one or more data items the data set 106.

As a first example, the data version conflict resolution technique set 202 may include a first data version conflict resolution technique 204 that applies a manual conflict resolution. When a conflict 118 in at least one data item 108 is detected, the manual data version conflict resolution technique 204 may notify a client 112 and/or workload 210 of the existence of the data version conflict 118, e.g., a collection of alternative values and/or value sequences that have been applied to one or more data items 108 by two or more masters 114, where the coexistence of such data versions represents a conflict 118 (e.g., some servers 104 may recognize a first value or value sequence for the involved data items 108, while other servers 104 may recognize a second, distinct value or value sequence for the same involved data items 108). The data version conflict resolution technique 204 may present such data versions to a user or client 112, and may receive a selection of a particular data version to be applied to the data set 106 as the resolution outcome 206 of the data version conflict 118. The data version conflict resolution technique 204 may then notify all servers 104 of the server set 102 of the selected value or value sequence that is to be recognized for the at least one data item 108.

As a second example, the data version conflict resolution technique set 202 may include a second data version conflict resolution technique 204 that applies a write order conflict resolution. When a conflict 118 in at least one data item 108 is detected, the write order data version conflict resolution technique 204 may identify the order in which the updates 116 were requested (e.g., according to a timestamp affixed to the respective updates 116 the clients 112 and/or the masters 114). As one example, the write order data version conflict resolution techniques 204 may automatically identify and choose, e.g., the chronologically most recent update 116 as the current value(s) of the at least one data item 108, and as the data version conflict resolution outcome 206. The write order data version conflict resolution techniques 204 may then notify all other servers 104 of the data version conflict resolution outcome 206 (e.g., the value(s) to be regarded the current value(s) for the at least one data item 108), and may request that the other servers 104 discard any other values for the data item 108 that, if coexistent with the selected value, present a data version conflict 118.

As a third example, the data version conflict resolution technique set 202 may include a third data version conflict resolution technique 204 that applies a conflict resolution logic 218 to reach a data version conflict resolution outcome 206. The various data versions of the at least one data item 108 may be presented to the conflict resolution logic 218, and the server may receive form the conflict resolution logic 218 an election of a particular data version for the at least one data item 108. The write order data version conflict resolution techniques 204 may then notify all other servers 104 of the data version conflict resolution outcome 206 (e.g., the value(s) selected by the conflict resolution logic 218) and may request that the other servers 104 discard any other values for the data item 108 that, if coexistent with the selected value, present a data version conflict 118.

As a fourth example, the data version conflict resolution technique set 202 may include a fourth data version conflict resolution technique 204 that reaches a conflict resolution based on a conflict-free replicated data type (CRDT) of one or more values involved in the data version conflict 118. When a conflict 118 in at least one data item 108 is detected, the CRDT data version conflict resolution technique 204 may identify the data type of a data item 108 involved in the conflict 118. As a first example, a first data item 108 and a second data item 108 may each comprise an array or sequence of values for a data item 108. However, the first data item 108 may be identified as a data type involving a sequence of chronologically ordered values, wherein a first update 116 with an earlier timestamp always precedes a second update 116 with a later timestamp in the sequence; while the second data item 108 may be identified as a data type involving a sequence of numerically ordered values, wherein a first update 116 with a lower value always precedes a second update 116 with a higher value in the sequence. As a second example, a first data item 108 and a second data item 108 may each comprise an integer. However, the first data item 108 may be further identified as a grow-only counter, such that when a conflict 118 is detected among two or more updates 116 of the value of the first data item 108, a numeric maximum of the values is selected as the current value of the data item 108. Conversely, the second data item 108 may be identified as a summing counter, such that a data version conflict 118 involving a first update 116 with a value of 6 and a second update 116 with a value of 4 result in an update of the second data item 18 to the sum of ten.

The example scenario 200 of FIG. 2 presents a data set 106 in which various data items 108 within the data set 106 have an association 214 with a conflict resolution technique 204 of the data version conflict resolution technique set 202. The associations 214 may be established at varying levels of granularity; e.g., a first data item 108 comprising the first workload 210, including all relational tables 212, may have an association 214 with a first conflict resolution technique 204, such as the CRDT data version conflict resolution technique 204, wherein the conflict-free replicated data types 216 of the attributes of the relational tables 212 are utilized to address data version conflicts 118 and reach data conflict resolution outcomes 206. For the portion of the data set 106 servicing the second workload 210, a second relational table 212 and a third relational table 212 may comprise data item 108 that respectively have associations 214 with the conflict resolution logic conflict resolution technique 204. Each table 212 may further be associated with and/or may provide a conflict resolution logic 218, and the conflict resolution logic conflict resolution technique 204 may be invoked to address a conflict 118 in either data item 108 by retrieving and invoking the conflict resolution logic 218 with the respective versions of the data item 108 (e.g., the updates 116 to the data item 108 where coexistence of the updates 116 presents a data version conflict 118). Further, a fifth relational table 212 of the second workload 210 may present attributes respectively comprising an association 214 with a data version conflict resolution technique 204; e.g., conflicts 118 involving a first attribute may be resolved using a manual conflict resolution technique, while conflicts 118 involving a second attribute may be resolved using a write order conflict resolution technique 204. The data version conflict resolution technique set 202 and associations 214 between the respective data items 108 of the data set 106 (optionally defined by a varying scope or subset of the data set 106) and a data version conflict resolution technique 204 therefore promote flexibility in permitting different portions of the data set 106 to resolve data version conflicts 118 in a selective manner in accordance with the techniques presented herein.

C. TECHNICAL EFFECTS

The configuration of a server 104 to provide a data set 106 in accordance with the techniques presented herein may lead to a variety of technical effects.

A first technical effect that may be achieved in some embodiments of the currently presented techniques is the capability of the server set 102 to support multiple masters 114. Server sets 102 that are constrained to a single-master configuration may incur limitation in achievable performance factors, such as reduced latency, scalability, and availability and resiliency to faults. The introduction of multiple masters 114 may depend upon the inclusion of techniques for addressing data version conflicts 118 when multiple versions of a data item 108 are generated by different masters 114. The techniques presented herein may alleviate such concerns, and may therefore permit the server set 102 to offer and/or comply with higher performance factors than may be achieved with single-master serer sets 102.

A second technical effect that may be achieved in some embodiments of the currently presented techniques is the reduction, avoidance, and/or resolution of data version conflicts 118. The incidence of data version conflicts 118 may jeopardize the integrity of the data set 106, such as when servers 104 and/or clients 112 disagree as to the value or sequential order of properties of various data items 108. The techniques presented herein may adapt the server set 102 to detect data version conflicts 118, including, in some variations, in a proactive manner; may provide a mechanism for conflict resolution that produces an acceptable resolution outcome 206, in contrast with other techniques that may fail to resolve the data version conflict 118; and/or may expedite such resolution, in contrast with other techniques that may provide a less efficient or slower resolution process, during which time the data version conflict 118 may propagate or become more complicated to resolve.

A third technical effect that may be achieved in some embodiments of the currently presented techniques is the flexibility of such techniques between the data set 106 and the conflict resolution techniques 204 applicable thereto. As a first such example, and as shown in the example scenario 200 of FIG. 2, respective portions of the data set 106 may have associations 214 with different conflict resolution techniques 204 that are particularly suitable for the circumstance of the data version conflict 118, such as the type of data and the type of workload 210. For instance, some workloads 210 may be particularly sensitive to data version conflicts 118, such as financial transactions, entailing rigorous but computationally expensive conflict resolution techniques 204; but other workloads 210 processed by the same server set 102, and optionally by the same servers 104, may be comparatively tolerant of data version conflicts 118, for which the use of casual and computationally simple conflict resolution techniques 204 may be adequate. The flexibility of the framework to permit associations 208 of different data version techniques 204 for different portions of the data set 106 may promote conformity between the circumstances of the data set 106 and the types of conflict resolution techniques 204 applied thereto. As a second such example, in some embodiments (including the example scenario 200 of FIG. 2), the associations 214 between various portions of the data set 106 and a selected conflict resolution technique 316 may vary in scope; e.g., a first association 214 may indicate that a selected conflict resolution technique 316 is to be used for a selective piece of data, such as a single attribute of a table 212 or even a single record or data value, while a second association 214 may indicate that a selected conflict resolution technique 316 is to be used for a large portion of the data set 106, such as all data utilized by a particular workload 210. Such flexible granularity may promote both the efficient management of the data set 106 while preserving the selectivity with which the associations 214 may be established. As a third such example, in some embodiments, the data version conflict resolution technique set 202 may be expanded with additional conflict resolution techniques 204, such as new conflict resolution techniques 204 that are designed for a specific workload 210. The framework depicted, e.g., in the example scenario 200 of FIG. 2 may easily accommodate the addition of new conflict resolution techniques 204, with which associations 214 may be established to indicate new conflict resolution mechanisms for particular circumstances.

A fourth technical effect that may be achieved in some embodiments of the currently presented techniques is a more comprehensive and robust conflict resolution framework for resolving data version conflicts 118. In some scenarios, a particular conflict resolution technique 204 may fail to resolve a data version conflict 118. For instance, a write order conflict resolution technique 204 may typically choose among conflicting updates 116 to a data object in a chronological manner, but in some circumstances, two conflicting updates 116 are presented with identical timestamps. If the server set 102 is not configured to address this scenario, then a deterministic data version conflict resolution outcome 206 may be unachievable, and conflict resolution may degrade to the level of arbitrary selection, exhibiting the typical disadvantages of race conditions. In view of such possibilities, the conflict resolution framework shown in the example scenario 200 of FIG. 2 may permit two or more associations 214 between a particular data item 108 and two or more conflict resolution techniques 204, such as a primary conflict resolution technique 204 to be tried first, and a secondary conflict resolution technique 204 to be invoked if the primary conflict resolution technique 204 fails to resolve the data version conflict 118. Many such technical effects may be achieved in server sets 102 that provide data sets 106 in accordance with the conflict resolution techniques presented herein.

D. PRIMARY EMBODIMENTS

Figure 3:
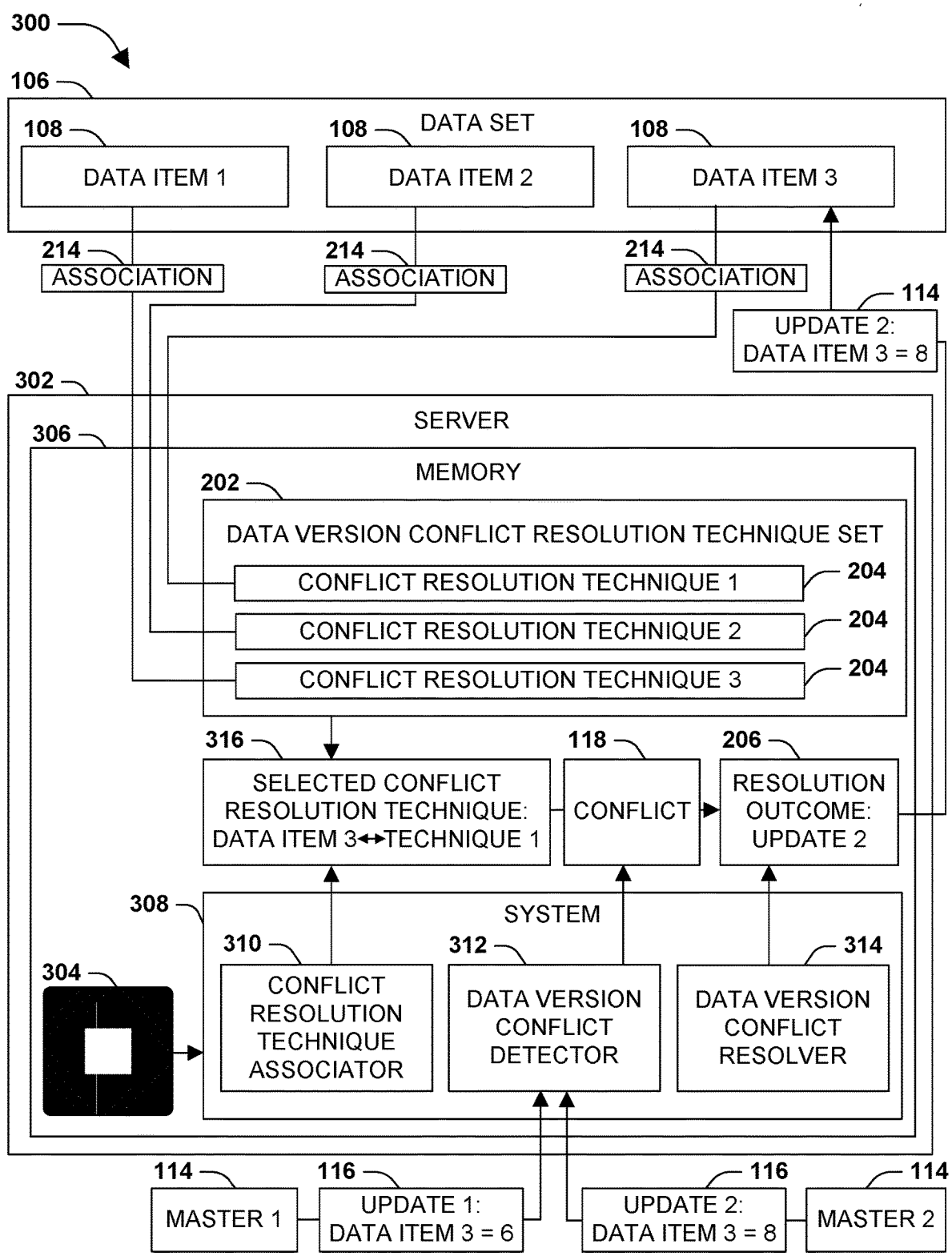
FIG. 3 is a component block diagram illustrating an example server of a multi-master server set that features an example system that applies updates to a data set in accordance with the techniques presented herein.

FIG. 3 is an illustration of an example scenario 300 featuring a first set of example embodiments of the techniques presented herein. In this example scenario 300, a first example embodiment comprises an example server 302 of a data set 106, comprises a processor 304 and a memory 306 storing instructions that, when executed by the processor 304, cause the example server 302 to apply updates 116 to the data set 106 in accordance with the conflict resolution techniques presented herein. As additionally shown in this example scenario 300, a second example embodiment comprises an example system 308 of components that, when executed by a processor 304 of an example server 302 of the data set 106, cause the example server 302 to apply updates 116 to the data set 106 in accordance with the conflict resolution techniques presented herein. The components of the example system 308 may comprise, e.g., sets of software instructions that, when executed by the processor 304, cause the example server 302 to apply at least one task in accordance with the conflict resolution techniques presented herein. Alternatively, the components of the example system 308 may comprise, e.g., electronic components, such as application-specific integrated circuits (ASICs) that embody and apply at least one task in accordance with the conflict resolution techniques presented herein.

In this example scenario 300, the example server 302 comprises a data version conflict resolution technique set 202, which in turn comprise a collection of data version conflict resolution techniques 204 that respectively resolve data version conflicts 118 among versions of one or more data items 108 of the data set 106. The data set 106 or a portion thereof may be stored by the example server 302; alternatively, the data set 106 may be stored remotely and/or distributed over the server set 102, and only locally cached and/or mirrored by the example server 302; or, as another alternative, the data set 106 may be only stored remotely and merely accessed by the example server 302. As further illustrated in the example scenario 300 of FIG. 3, in accordance with the techniques presented herein, the example system 308 comprises a conflict resolution technique associator 310, which establishes and/or identifies associations 214 between respective data items 108 and the data version conflict resolution techniques 204 selected from the data version conflict resolution technique set 202. The example server 302 receives, from a first master 114 and a second master 114 respectively, updates 116 to a particular data item 108 of the data set 106 (e.g., the third data item 108). For example, the conflict resolution technique associator 310 may identify a selected conflict resolution technique 316 that has an association 214 with a selected portion of the data set 106 comprising a selected data item 108. The example system 308 further comprises a data version conflict detector 312, which detects, in at least one data item 108 of the data set 106, a data version conflict 118 created by the coexistence of the updates 116. The example system 308 further comprises a data version conflict resolver 314, which resolves the data version conflict 118 created by the coexistence of the updates 116 by invoking the selected conflict resolution technique 316 that has an association 214 with the at least one data item 108 with the updates 116, where such invocation generates a conflict resolution outcome 206, such as an identification of a selected update 116 to be applied (while discarding the other update 116) and/or a merging of the conflicting updates 116. The data version conflict resolver 314 further applies the conflict resolution outcome 206 to the data set 106 to resolve the data version conflict 118. In this manner, the example components of the example system 308 and/or the example server 302 may enable the resolution of data version conflicts 118 in the manner described and claimed herein.

Figure 4:
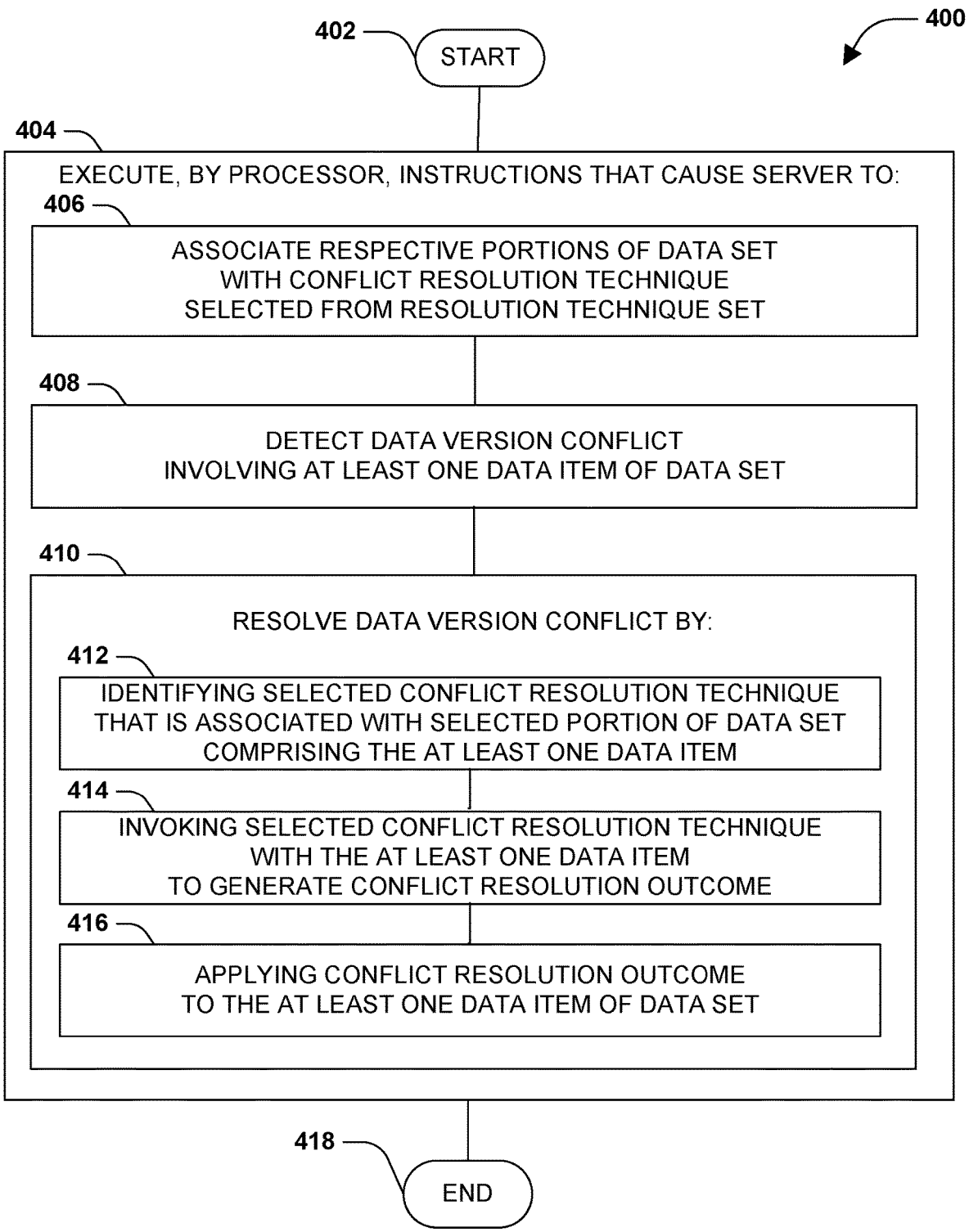
FIG. 4 is an illustration of a first example method of configuring a server of a server set to apply updates to a data set in accordance with the techniques presented herein.

FIG. 4 is an illustration of a first example embodiment of the techniques presented herein, illustrated as a first example method 400 of configuring a server of a server set to process a workload comprising a data set. The first example method 400 involves a server comprising a processor 304, and may be implemented, e.g., as a set of instructions stored in a memory 306 of the server, such as firmware, system memory, a hard disk drive, a solid-state storage component, or a magnetic or optical medium, wherein the execution of the instructions by the processor 304 causes the server to operate in accordance with the techniques presented herein.

The first example method 400 begins at 402 and involves executing 404, by a processor 304 of the server, instructions that cause the server to operate in accordance with the techniques presented herein. In particular, execution of the instructions causes the server to associate 406 respective portions of the data set 106 with a conflict resolution technique 204 selected from a data version conflict resolution technique set 202. Execution of the instructions also causes the server to detect 408 a data version conflict 118 involving at least one data item 108 of the data set 106. Execution of the instructions also causes the server to resolve 410 the data version conflict 118 by identifying 412 a selected conflict resolution technique 204 that is associated with a selected portion of the data set 106 comprising the at least one data item 108; invoking 414 the selected conflict resolution technique with the at least one data item 108 to generate a conflict resolution outcome 206; and applying 416 the conflict resolution outcome 206 to the data set 106. Having achieved the resolution of the data version conflict 118 using the data version conflict resolution technique set 202, the first example method 400 promotes, maintains, and/or restores the consistency of the data set 106 in accordance with the techniques presented herein, and so ends at 418.

Figure 5:
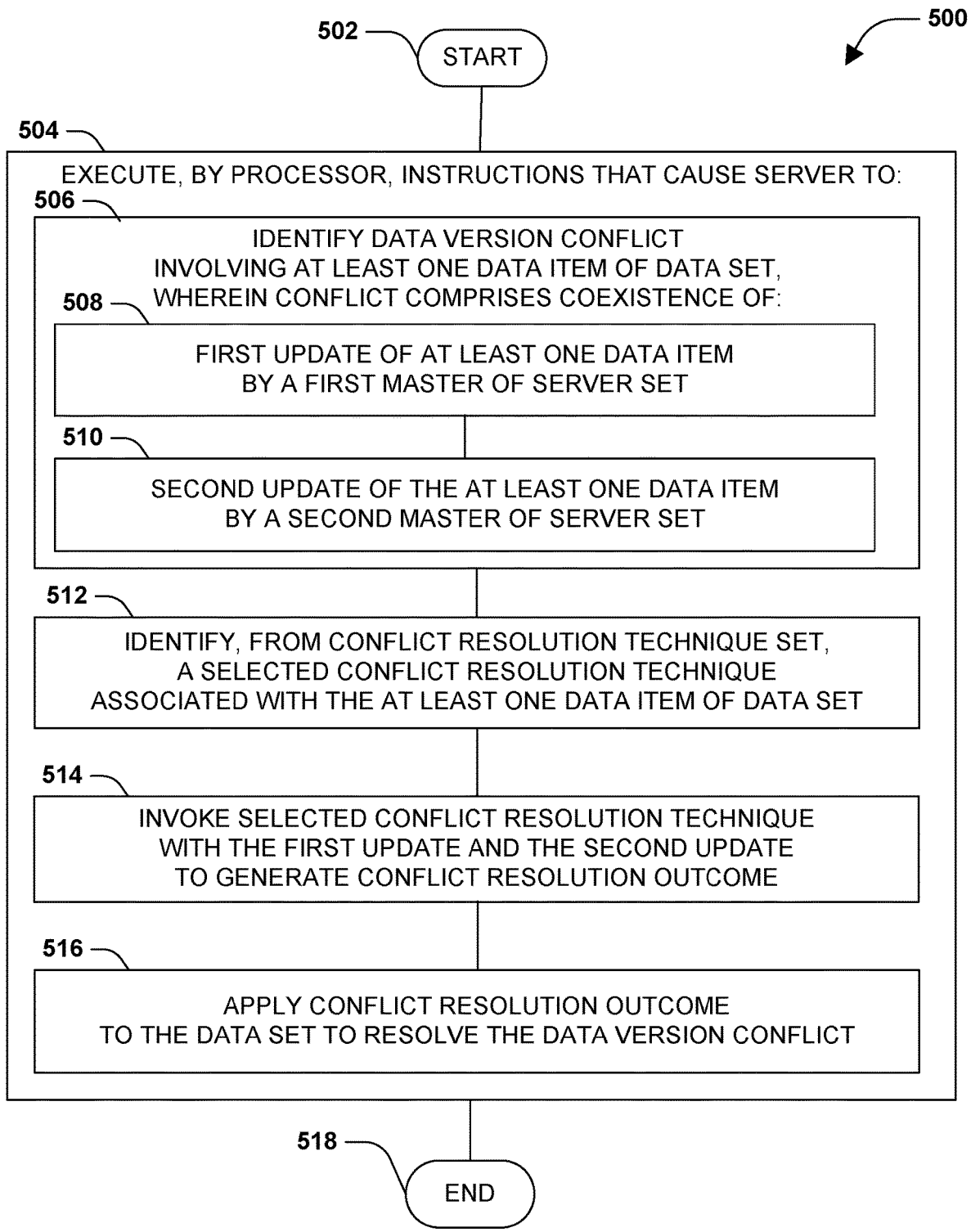
FIG. 5 is an illustration of a second example method of configuring a server of a server set to apply updates to a data set in accordance with the techniques presented herein.

FIG. 5 is an illustration of a second example embodiment of the techniques presented herein, illustrated as a second example method 500 of configuring a server of a server set to process a workload comprising a data set. The second example method 500 involves a server comprising a processor 304, and may be implemented, e.g., as a set of instructions stored in a memory 306 of the server, such as firmware, system memory, a hard disk drive, a solid-state storage component, or a magnetic or optical medium, wherein the execution of the instructions by the processor 304 causes the server to operate in accordance with the techniques presented herein.

The second example method 500 begins at 502 and involves executing 504, by a processor 304 of the server, instructions that cause the server to operate in accordance with the techniques presented herein. In particular, execution of the instructions causes the server to detect 506 a data version conflict 118 involving at least one data item 108 of the data set 106, wherein the data version conflict 118 comprises a coexistence of a first update 508 of the at least one data item 108 by a first master 114 of the server set 102, and a second update 510 of the at least one data item 108 by a second master 114 of the server set 102. Execution of the instructions also causes the server to identify 512, from a data version conflict resolution technique set 202, a selected conflict resolution technique 316 that is associated with the at least one data item 108 the data set 106. Execution of the instructions also causes the server to invoke 514 the selected conflict resolution technique 316 with the first update 508 and the second update 510 to generate a conflict resolution outcome 206. Execution of the instructions also causes the server to apply 516 the conflict resolution outcome 206 to the data set 106 to resolve the data version conflict 118. Having achieved the resolution of the data version conflict 118 using the data version conflict resolution technique set 202, the second example method 500 promotes, maintains, and/or restores the consistency of the data set 106 in accordance with the techniques presented herein, and so ends at 518.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
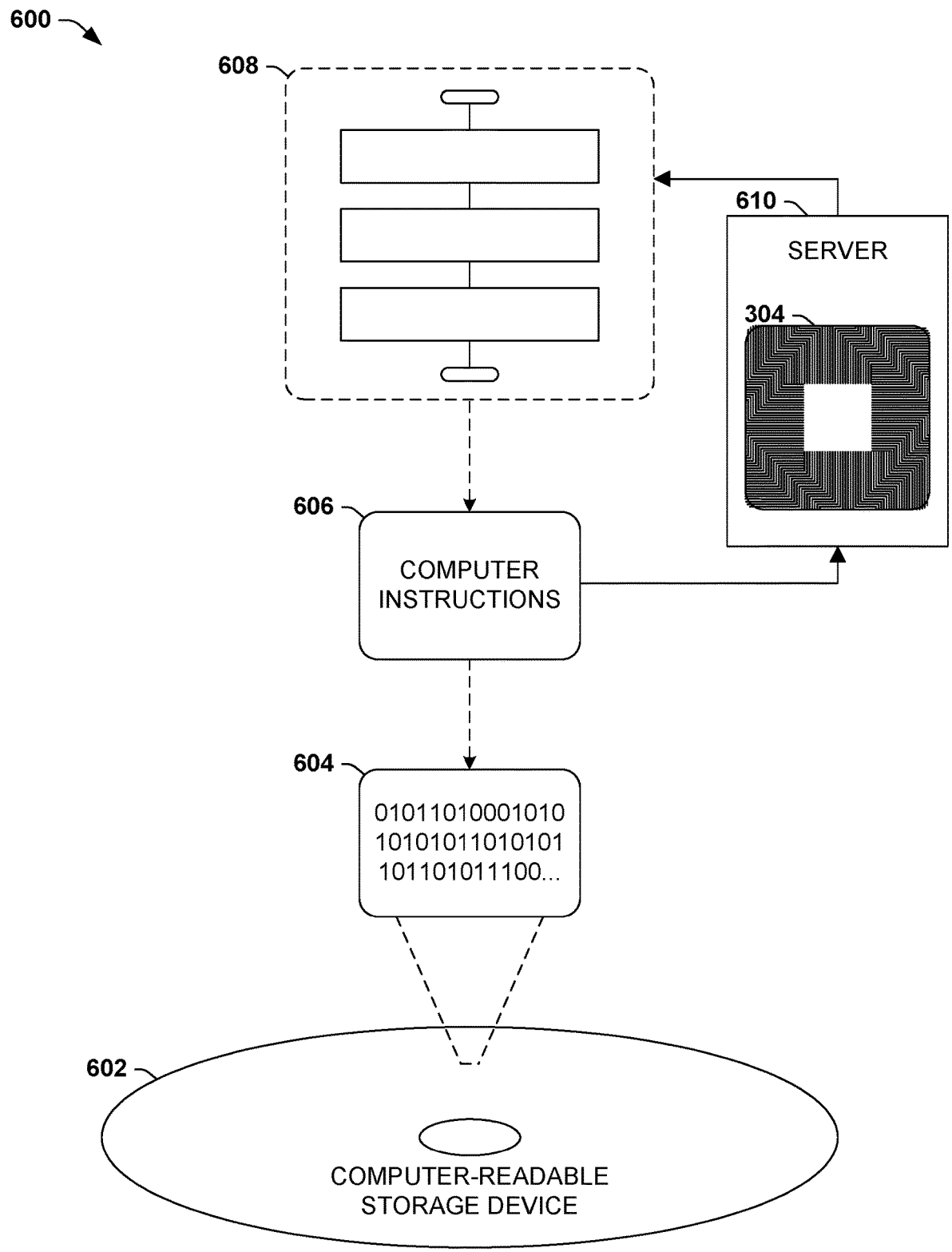
FIG. 6 is an illustration of an example computer-readable storage device storing instructions that, when executed by a processor of a server of a multi-master server set, cause the server to apply updates to a data set in accordance with the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 304 of a server 610, provide an embodiment 608 that causes the server 610 to operate according to the principles set forth herein. For example, the processor-executable instructions 606 may encode a system that provides a data set 106 on behalf of a client set 110, such as the example server 302 and/or the example system 308 of FIG. 3. As another example, the processor-executable instructions 606 may encode a method of providing a data set 106, such as the first example method 400 of FIG. 4 and/or the second example method 500 of FIG. 5. Many such computer-readable media may be devised by those of ordinary skill in the art that are configured to operate in accordance with the techniques presented herein.

E. VARIATIONS

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

E1. Scenarios

A first aspect that may vary among scenarios in which the techniques may be utilized relates to the server sets 102 with which such techniques may be utilized. For example, the presented techniques may be utilized with a variety of servers 104, such as workstations, laptops, consoles, tablets, phones, portable media and/or game players, embedded systems, appliances, vehicles, and wearable devices. The server set 102 may comprise a collection of server units, such as a collection of server processes executing on a device; a personal group of interoperating devices of a user; a local collection of server units comprising a computing cluster; and/or a geographically distributed collection of server units that span a region, including a global-scale distributed database. Such servers 104 may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication). The techniques presented herein may be particularly advantageous in widely distributed databases, in which significant communication latency may promote the technical advantages of providing multiple masters 114 that are respectively capable of updating the data set 106 for selected regions of the world, and/or in which communication latency and/or the scale of the data set 106 may exacerbate the incidence of data version conflicts 118.

A second aspect that may vary among scenarios in which the techniques may be utilized involves the types of workloads 210 that are processed by the server set 102. Such workloads 210 may include databases of various types, including relational databases such as SQL, object graph databases, and key/value store databases, as well as mixed-modality databases that support various data structures and/or query languages. Such workloads 210 may also include, e.g., websites; web services; microservices; computing environments provided to various devices; data processing services, such as image processing, data mining, and/or artificial intelligence services; and/or local or remote applications, such as games. Additionally, the presented techniques may be utilized with a variety of data sets 106 exhibiting a variety of data models, such as a relational database comprising tabular data organized into tables comprising sets of attributes and sets of rows presenting values for the respective attributes; graph data comprising a graph of nodes with interconnecting edges; key/value pairs of keys and associated values; and documents provided as structured or unstructured collections of entities. Such data sets 106 may also be used in a variety of circumstances, such as data warehousing; content provided through a content system such as a webserver; and object systems for an application or operating system. Some data sets 106 may comprise a hybrid of several data models, which may be aggregated in a horizontal manner (e.g., a collection of items of which some items are provided and/or requested in a first native item format, such as relational data, and other items are provided and/or requested in a second native item format, such as entities within documents) and/or non-horizontal manner (e.g., a collection of items in a first native item format, such as entities within documents, may be described by metadata represented by other items provided in a second native item format, such as relational data). Many such scenarios may be identified in which the techniques presented herein may be advantageously utilized. Additionally, such workloads 210 may be provided by, provided for, accessed by, and/or processed on behalf of a variety of clients 112, such as a client process on a server 104 storing the data set 106; other servers 104 within the server set 102; and/or various client devices that utilize the server set 102 on behalf of one or more users and/or other devices. Many such variations may be included in variations of the techniques presented herein.

E2. Data Version Conflict Resolution Techniques

A second aspect that may vary among embodiments of the presented techniques involves variations of the data version conflict resolution techniques 204 that are available for and/or applied to various portions of the data set 106.

As a first variation of this second aspect, the data version conflict resolution technique set 202 may include a variety of data version conflict resolution techniques 204. Some examples are provided in the example scenario 700 of FIG. 7, which are discussed in turn in the following subsections. In some variations, the data version conflict resolution set 202 may permit the addition of new data version conflict resolution techniques 204, which may be suitable for resolving data version conflicts 118 arising in particular types of data sets 106, such as unusual data items 108; unusual methods of resolving data version conflicts 118; additional functionality to be performed during data version conflict resolution, such as logging and/or data integrity verification; and/or conflict resolution techniques that are optimized for various performance factors, such as speed of resolving data resolution conflicts.

E2A. Manual Data Version Conflict Resolution

As a first variation of this second aspect, the data version conflict resolution technique set 202 may include a manual data version conflict resolution technique 702.

Figure 7:
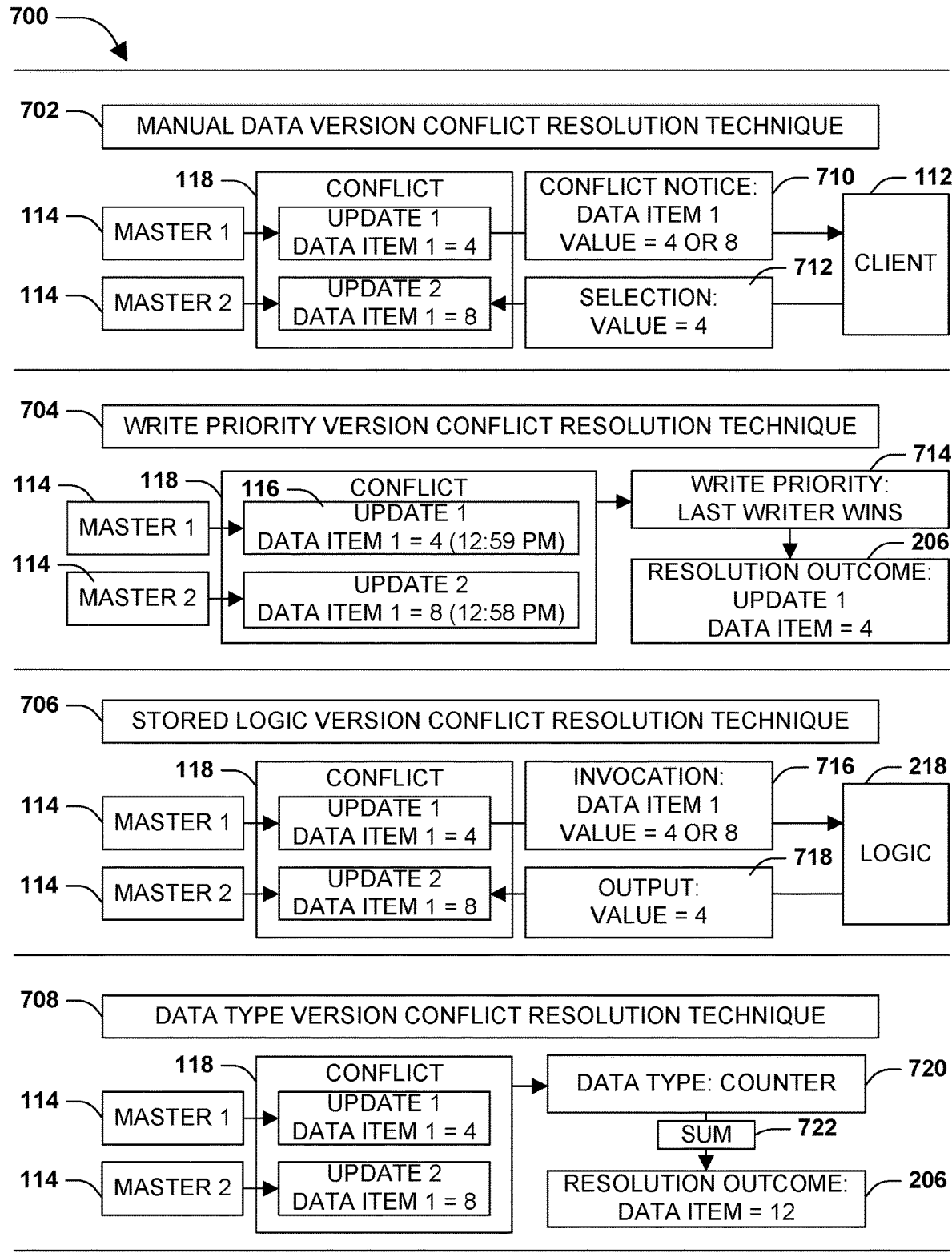
FIG. 7 is an illustration of example scenarios featuring a variety of data version conflict resolution techniques that may be included in accordance with the techniques presented herein.

In the example scenario 700 of FIG. 7, a data version conflict 118 arises due to conflicting updates 116 by different masters 114 of a data item 108 that is associated with a manual data version conflict resolution technique 702. A server 104 may register the data version conflict 118 (e.g., in a data version conflict log) and/or providing a notification 710 to a client 112, such as a user of the data set 106 or a workload 210 utilizing the involved data items 108 (e.g., an application that created or that utilizes the one or more data items 108, including an application that created the data version conflict 118). Such logging and/or notification 710 may serve as a request for the client 112 to resolve the data version conflict 118. A selection 712 by the client 112, such as a selection of one of the updates 116 may be accepted as the data version conflict resolution outcome 206, and may be applied to the one or more data items 108 to resolve the data version conflict 118.

Manual data version conflict resolution techniques 702 may exhibit a number of variations. As a first example, a notification 710 may inform the client 112 of the detection of a data version conflict 118 and may ask the client 112 to investigate, such as advising the client 112 to check the contents of a log in which the data version conflict 118 is recorded. Alternatively or additionally, the notification 710 may identify the one or more data items 108 involved in the data version conflict 118 and/or the updates 116 for which coexistence presents a data version conflict 118 (e.g., the notification 710 may include the different versions of the data item 108, such as the values raised by the conflicting updates 116).

As a second example, the notification 710 may simply notify and advise the client 112 of the data version conflict 118, and ask the client 112 to take steps to resolve the coexistence of the updates 116 that creates the data version conflict 118. Alternatively, the notification may assist the client 112 in providing the data version conflict resolution outcome 206. For example, the notification 710 may include a set of selectable conflict resolution outcome options, and the selection 712 of an option by the client 112 may be accepted as the data version conflict resolution outcome 206, and/or may present different views of the data set 102 with different updates 116 applied (such as a side-by-side view reflecting the application of different updates 116).

As a third example, the manual data version conflict resolution technique 702 may initiate a notification 710 for each data version conflict 118, or may notify the client 112 of a batch of data version conflicts 118. Batching may occur, e.g., by recording data version conflicts 118 until a threshold number of data version conflicts 118 has been collected (e.g., one hundred conflicts), and then transmitting a notification batch to the client 112 with the full set of data version conflicts 118. As another example, batching may be periodic; e.g., data version conflicts 118 may be collected over a time period, such as one day, and a notification 710 may be sent to the client 112 with the complete set of data version conflicts 118 arising within the time period. As yet another example, batching may be prioritized, such as rating data version conflicts 118 based on the severity or impact on the data set 106, and sending a notification 710 to the client 112 when the aggregate priority of the stored data version conflicts 118 exceeds a priority threshold (e.g., for one high-priority data version conflict 118 occurs, or for ten low-priority data version conflicts 118). Additionally, the manual data conflict resolution technique 702 may receive, from the client 112, a set of selections 712 of conflict resolution outcome options for respective data version conflicts 118 of the notification batch, and apply the set of selections 712 to resolve all or several of the data version conflicts 118 of the notification batch.

As a fourth example, the manual data version conflict resolution technique 702 may accept from the client 112 and apply to the data set 106 an alternative instruction to address the data version conflict 118, such as setting the value of the data item 108 to a different value that merges the updates 116; applying the updates 116 in a particular sequential order; or deleting all of the conflicting updates 116.

E2B. Write Priority Data Version Conflict Resolution

As a second variation of this second aspect, the data version conflict resolution technique set 202 may include a write priority data version conflict resolution technique 704 that resolves data version conflicts 118 through a comparison of write priorities of respective updates 116.

In the example scenario 700 of FIG. 7, a data version conflict 118 arises due to conflicting updates 116 by different masters 114 of a data item 108 that is associated with a write priority data version conflict resolution technique 704. A server 104 may examine the respective updates 116 to identify a selected update 116 that has priority over at least one non-selected update 116. The respective updates 116 include a timestamp, and the write priority 714 is defined as a "last writer wins" policy that resolves data version conflicts 118 through a chronological sequencing of updates 116 that selects the update 116 having the latest timestamp. The write priority data version conflict resolution technique 704 may then apply the selected update 116 to the at least one data item 108 involved in the data version conflict 118 as the data version conflict resolution outcome 206 to resolve the data version conflict 118 of the data set 106.

Write priority version conflict resolution techniques 704 may exhibit a number of variations. As a first example, the write priority 714 may be based on a number of factors, such as value (e.g., writes may be selected in strict order, such as "lowest-value-wins" or "highest-value-wins" among the values in the set of conflicting updates 116); numeric sequence (e.g., the data item 108 may have a current value, such as 5, and the selected update 116 may be the next closest value above the current value, such as choosing a first update 116 with the value of 7 over a second update 116 with a value of eight); chronological sequence (e.g., "first-writer-wins" or "last-writer-wins," such as based on timestamps indicating when the respective updates 116 were initiated by a workload 210, received and/or transmitted by a master 114, and/or identified as involved in a data version conflict 118); the type of update 116 (e.g., updates 116 that change a value of a data item 108 may have write priority over updates 116 that delete the value or the data item 108); the source of the update 116 (e.g., updates 116 of the data item 108 by a first workload 210 and/or received by a first master 114 having a high priority, may be selected over updates 116 of the data item 108 by a second workload 210 and/or received by a second master 114 having a lower priority); and/or the impact of accepting the updates to the data set 106 (e.g., a first update 116 that retains a current value of the data item 108 intact may be selected over a second update 116 that involves changing the current value of the data item 108; or a first update 116 for which the data version conflict 118 is resolvable by changing only the value of a particular data item 108 may be selected over a second update 116 for which the data version conflict 118 is resolvable only by changing the values of a plurality of data items 108). In variations that involve chronological sequencing, the times of the updates 116 may be determined in a variety of ways; e.g., if the servers 104 share a synchronized clock, the updates 116 may be compared by timestamp, but if the distributed servers 104 do not share a synchronized clock, the updates 116 may be compared by logical sequence numbers.

As a second example, the write priorities 714 may be determined in a number of ways. For instance, the values and/or metadata of the updates 116 may be inspected at the time of the data version conflict 118 to establish and compare the write priorities 714. As another example, the data set 106 may store a set of write priorities 714 for various types of updates 116, and the write priority version conflict resolution technique 704 may consult the data set 106 to determine the write priorities to be compared at the time of the data version conflict 118 in order to identify which update 116 is to be selected as the data version conflict resolution outcome 206. In one such scenario, write priority 714 may be determined according to the source of an update 116 (e.g., updates 116 from a first master 114, client 112, or workload 210 may have write priority 714 over a second master 114, client 112, or workload 210), and upon invocation 716, the write priority version conflict resolution technique 704 may consult the data set 106 to identify the write priorities 714 of the sources of the updates 116 creating the data version conflict 118, and may then compare the write priorities 714 thereof in order to choose the update 116 as the data conflict resolution outcome 206.

E2C. Stored Conflict Resolution Logic

As a third variation of this second aspect, the data version conflict resolution technique set 202 may include a stored logic data version conflict resolution technique 706 that resolves data version conflicts 118 by retrieving and invoking a conflict resolution logic 218 that is associated with at least one data item 108, and which has been provided in order to for resolving data version conflicts 118 of the at least one data item 108.

In the example scenario 700 of FIG. 7, a client 112 provides a conflict resolution logic 218 that is to be used to evaluate and/or resolve data version conflicts 118 that may arise within a particular portion of the data set 106 of a workload 210. A server 104 identifies a data version conflict 118 involving updates 116 from different masters 114. The server 104 resolves the data version conflict 118 by retrieving the conflict resolution logic 218 and invoking it with the updates 116. The conflict resolution logic 218 provides output 718 indicating a selection 712 of an update 116 to be applied to resolve the data version conflict 118. The server 104 receives the output 718 as a data version conflict resolution outcome 206 and applies the selected update 116 to the data set 106 to resolve the data version conflict 118.

Stored logic priority version conflict resolution techniques 706 may exhibit a number of variations. As a first example, the conflict resolution logic 218 may be stored in the data set 106, either using a feature of a database system (e.g., as a stored procedure or trigger) or as a generic data object that is retrieved and used as the conflict resolution logic 218 (e.g., a text field of a table, where the value of the text field is a conflict resolution logic script). Alternatively, the conflict resolution logic 218 may be stored by a server 104 outside of and separately from the data set 106 (e.g., an application cache).

As a second example, the conflict resolution logic 218 may be encoded in a number of ways, such as a wholly or partly compiled executable binary; source code written in a variety of languages, such as C, C#, or Java; an interpretable script, such as Python; and/or a language of the data set, such as a variant of SQL. For conflict resolution logic 218 that is compiled and/or interpreted in order to be executed, an embodiment of the currently presented techniques may compile and/or interpret the logic in advance of the data version conflict 118, and an executable form, such as a compiled binary, may be stored in anticipation of future data version conflicts 118. Such precompilation may be advantageous, e.g., for promoting the speed of data version conflict resolution outcome 206. Alternatively, the uncompiled and/or uninterpreted conflict resolution logic 218 may be stored upon receipt, and may be compiled and/or interpreted in response to the detection of a data version conflict 118. Such just-in-time compilation may be advantageous, e.g., for configuring customizable conflict resolution logic 218 in view of the particular type of data version conflict 118 to be resolved.

As a third example, the conflict resolution logic 218 may be stateful (e.g., recording the incidence of data version conflicts 118, and/or resolving a current data version conflict 118 in view of past data version conflicts 118) or stateless (e.g., resolving each data version conflict 118 irrespective of the receipt and/or resolution of other previous or concurrent data version conflicts 118 arising in the data set 106).

As a fourth example, a conflict resolution logic 218 may be limited to an examination of the conflicting data versions of the data item(s) 108 involved in the data version conflict 118. Such limitation may be advantageous, e.g., for expediting resolution of the data version conflict and/or protecting the security of the data set 106 by granting access only to the data items 108 involved in the data version conflict 118. Alternatively, a conflict resolution logic 218 may be permitted to inspect other aspects of the data set 106 in the context of evaluating and resolving the data version conflict 118 (e.g., determining the consequences of choosing each update 116 on the overall integrity of the data set 106).

As a fifth example, the conflict resolution logic 218 may be provided from a variety of sources for association with a data item 108 of the data set 106 (e.g., from a client 112 such as a user, a workload 210, a device such as another server 104, a service, an application, or another data set 106). Alternatively, a server 104 may store a collection of conflict resolution logic 218 that may be applicable to resolve a variety of data version conflicts 118 for various data items 108, and a client 112 may indicate that a particular conflict resolution logic 218 is to be used to resolve data version conflicts 118 arising within the data set 106.

As a sixth example, the conflict resolution logic 218 may be received and stored prior to the data version conflict 118, and then retrieved from the data store and invoked in response to the data version conflict 118. Alternatively, the conflict resolution logic 218 may first be received at the time of the data version conflict 118, e.g., by notifying a client 112 of the data version conflict 118 and requesting a conflict resolution logic 218 to address the data version conflict 118. The conflict resolution logic 218 received from the client 112 may be prepared ad-hoc, e.g., as a one-time logic specifically created to resolve the data version conflict 118, and may be discarded following the resolution of the data version conflict 118. Alternatively, a server 104 may store the conflict resolution logic 218 in a temporary store such as a cache, in case a second, similar data version conflict 118 arises in the future that the previously provided conflict resolution logic 218 may be invoked to generate a data version conflict resolution outcome 206. As another alternative, a server 104 may store the conflict resolution logic 218 received to address the data version conflict 118 in a persistent store, such as the data set 106, and optionally may associate the conflict resolution logic 218 with the one or more data items 108 for which the conflict resolution logic 218 was provided, i.e., to resolve future conflicts involving the same or similar data items 108.

E2D. Data Type Conflict Resolution

As a fourth example of this second aspect, the data version conflict resolution technique set 202 may include a data type conflict resolution technique 708 that resolves data version conflicts 118 according to the semantics of the data types of the data items 108 involved in the data version conflict 118.

In the example scenario 700 of FIG. 7, a data type version conflict resolution technique 708 is associated with a data item 108 of a particular data type 720 that indicates an update semantic by which updates 116 are to be applied to the data item 108. In this example scenario 700, the data type 720 comprises not only an integer but a counter, where an update 116 to the value of the integer is applied by summing 722 the update 116 with the current value of the integer. This update semantic is used to resolve a data version conflict 118 between updates 116 respectively received from a first master 114 and a second master 114. When such conflicting updates 116 arrive, a server 104 may identify the data type 720 of the data item 108 and the update semantic of the data type 720, and may apply the updates 116 to the data item 108 in accordance with the update semantic of the data type 720 of the data item 108 to resolve the data version conflict 118 (i.e., by summing the current value of the data item 108 together with both the first update 116 and the second update 116).

Stored logic priority version conflict resolution techniques 706 may exhibit a number of variations. As a first example, the data type 720 of a data item 108 may comprise a conflict-free replicated data type (CRDT), whereby a data item 108 is specified as both a format (e.g., a Boolean value, an integer, a string, or an array) and also a well-defined update semantic by which updates 116, including conflicting updates 116 that present a data version conflict 118, are to be applied to the value of the data item 108.

The update semantic of some data types 720 may indicate an operational updating of the value of the data item 108 (e.g., each update 116 is to be regarded as a relative offset of the data item 108 from a current or previous value), such that conflicting updates 116 may be applied as a sequence of relative offsets (e.g., as a sum of the current value and the relative offset values in the conflicting updates 116, as in the example scenario 700 of FIG. 7). For some data items 108, the update semantic of the data type may indicate that the sequential order of such updates 116 is immaterial, and the updates 116 may be commutatively applied to the data item 108. For other data items 108, the update semantic of the data type 720 may indicate that sequential order of applying the updates 116 may affect the final value of the data item 108. For example, the data type 720 may characterize the integer as a non-negative integer. If the integer has an initial value of 1, and updates 116 are received with values of −5 and 2, then applying the updates 116 in this sequential order results in a final value of 2 (i.e., updating the value from 1 to 0, and then from 0 to 2), while applying the updates 116 in the reverse sequential order results in a final value of 0 (i.e., updating the value from 1 to 3, and then from 3 to 0). Accordingly, the data item 108 and/or the data type 720 may indicate a criterion for sequentially ordering the updates 116, such as by chronological sequence according to the timestamps of the updates 116.

The update semantic of other data type 720 may indicate state-based updating, where each update 116 indicates both the anticipated initial state of the data item 108 and the anticipated final state of the data item 108 upon application of the update 116. This update semantic may be used to determine whether two updates 116 may be applied in a consecutive sequence to arrive at the collectively anticipated result. For example, an integer with an initial value of 2 may be subjected to two updates by two different masters 114. While the concurrent pendency of the updates 116 may initially suggest a data version conflict 118, it may be determined that the first update 116 may request a change of the value from 5 to 7, while the second update 116 may request a change of the value from 2 to 5. The state-based changes of the updates 116 may therefore indicate the sequence by which the updates 116 are to be applied, and in compliance with the update semantic of the data type 720, the application of the updates 116 in the correct order may resolve the data version conflict 118. Alternatively, if the first update 116 requests a change of the value from 2 to 7 and the second update 116 may request a change of the value from 2 to 5, the update semantic may indicate that only one of the updates 116 may be applied. A further mechanism may be invoked to choose between the updates 116 (e.g., according to timestamp).

As a second example, a data item 108 may be identified as an array, and a data version conflict 118 may arise as a pair of concurrently pending requests to write an item to the array while it is in a particular state. That is, a first master 114 and a second master 114 may agree that the array currently has three elements, but both masters 114 may initiate requests to write a particular value as the fourth element in the array. A first data item 108 may include an update semantic indicating that such conflicts are to be resolved by appending both items to the array, and optionally specifying a selected appending order, such as chronological sequence according to timestamps. Alternatively, a second data item 108 may include an update semantic indicating that such conflicts are to be resolved by choosing one update 116, such as the chronologically earlier update 116 (e.g., "first writer wins") or the chronologically later update 116 (e.g., "last writer wins"), and discarding the other update 116. A third data item 108 may include an update semantic indicating that such conflicts are to be resolved via aggregation, such as appending to the array a single value comprising the minimum, maximum, sum, or average of both updates 116.

In some scenarios, a client 112 may specify the data type 720 as a primitive type with a particular update semantic from a recognized set (e.g., an integer that is to be updated in the manner of a counter with state-based changes), or as a conflict-free replicated data type selected from a conflict-free replicated data type schema (e.g., a grow-only counter). Alternatively, a client 112 may define and provide a schema describing the update semantics for one or more data items 108 (e.g., a TLA+specification describing one or more data types 720 for the data set 106 and the update semantics of such data types 720), where respective data items 108 may then be associated with one of the data types 720 described in the schema. In still other scenarios, a server 104 may provide an application programming interface (API) that assists with the determination of data types 720 and update semantics. For example, the API may examine a selected data item 108 of the data set 106 and information provided by a client 112, such as the significance and use the data item 108 in the context of a workload, may identify a conflict-free replicated data type (CRDT) that is suitable for the data item 108, and may store the identified CRDT and update semantic in the data set 106 for future use by the data type conflict resolution technique 708 to resolve data version conflicts 118 involving the data item 108. Many such data version conflict resolution techniques 204 may be included in data version conflict resolution technique sets 202 in accordance with the techniques presented herein.

E3. Association

A third aspect that may vary among embodiments of the techniques presented herein involves the association 208 of respective portions of a data set 106, including one or more data items 108, with respective data version conflict resolution techniques 204.

As a first variation of this third aspect, a client 112 (such as a user) may specify the associations 208 of respective portions of the data set 106 by identifying a selected data version conflict resolution technique 316 from the data version conflict resolution technique set 202. A server 104 may store the associations 208. When a data version conflict 118 arises involving a data item 108, the server 104 may select the association 208 for the data item 108, identify the data version conflict resolution technique 204 of the association 208 as indicated by the client 112, and invoke the selected data version conflict resolution technique 316 with the updates 116 of the data item 108 to resolve the data version conflict 118. In some embodiments, the identification of selected data version conflict resolution techniques 316 may be enforced, e.g., by prompting a user to indicate a selection or to accept a default selection.

Figure 8:
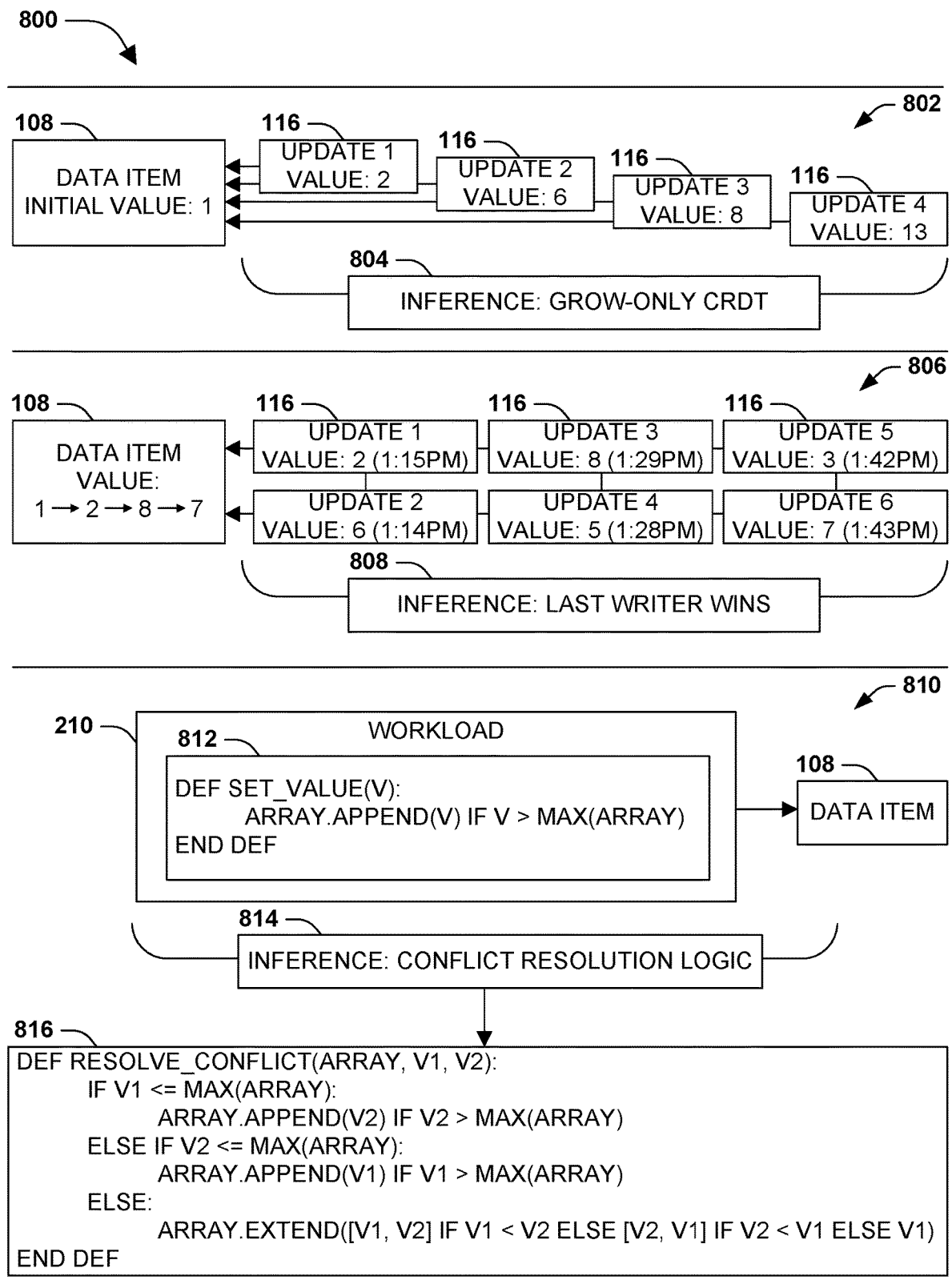
FIG. 8 is an illustration of example scenarios featuring inferences of associations between data items of a data set and data version conflict resolution techniques in accordance with the techniques presented herein.

Other variations may utilize various forms of inference to establish the associations 208 between data items 108 and data version conflict resolution techniques 204. FIG. 8 is an illustration of a set 800 of example scenarios featuring a few such inferences.

As a second variation of this third aspect, an association 208 between a data item 108 and a selected data version conflict resolution technique 316 may be inferred according to a data type 720 of one or more data items 108 of the data set 106. For example, if the data set 106 is populated with data items 108 that are characterized as conflict-free replicated data types (CRDTs) and/or that are associated with an identified update semantic, an inference may be made that at least those data items 108, and optionally similar data items 108 that have not been expressly designated as such, are to be associated with a data type conflict resolution technique 708.

As a third variation of this third aspect, an association 208 between a data item 108 and a selected data version conflict resolution technique 316 may be inferred according to an access pattern of a workload 210 over the data item 108. A selected data conflict resolution technique 316 may be identified to resolve data version conflicts involving portions of the data set 106 that are accessed according to the access pattern, and an association 208 may be established between the selected data conflict resolution technique 316 and the portions of the data set 106 over which the access pattern has been observed.

In a first example scenario 802 of FIG. 8, a data item 108 may be identified as an integer with an initial value, and observations of an access pattern of updates 116 to the data item 108 by a workload 210 may suggest that the value of the data item 108 is monotonically increasing (e.g., because successive updates 116 to the data item 108 consistently increase the value of the data item 108 in a monotonic manner). This inference 804 may be reached by examining the contents of the updates 116 submitted by the workload 210 for the data item 108. The continued observation of the access pattern of updates 116 by the workload 210 may enable a high-confidence inference 804 that the data item 108 is a monotonically increasing integer, and the data item 108 may be annotated, e.g., as a grow-only conflict-free replicated data type (CRDT). Additionally, the inference 804 based on the access pattern may permit an association 208 between the data item 108 and a data type conflict resolution technique 708 according to the inferred data type 720 of the data item 108, which may subsequently be invoked to resolve data version conflicts 118 in a manner that is consistent with the inference drawn from the observed memory access pattern.

As another example, in a second example scenario 806 of FIG. 8, a data item 108 is subjected to pairs of updates 116 (e.g., initiated by different masters 114 or clients 112) that request different values for a data item 108, where the coexistence of respective pairs of updates 116 represents a data version conflict 118. The sequences of requested updates 116 may not reveal a consistent memory access pattern upon which an inference may be based. However, observations of the resulting value of the data item 108 resulting from the evaluation of the pairs of updates 116 may enable an inference 808 that data version conflicts 118 are resolved according to a particular type of comparison of the updates 116, such as according to a timestamp of the updates 116 and a "last-writer-wins" conflict resolution, in which a first update 116 that was initiated more recently is consistently selected for application to the data item 108 over a second update 116 that was initiated earlier. The inference 808 may enable a selection of a write priority conflict data version conflict resolution technique 704, which selects, among a set of conflicting updates 116, an update 116 having a latest timestamp. Accordingly, a server 104 may establish an association 208 between the data item 108 and the write priority conflict data version conflict resolution technique 704, which may subsequently be invoked to resolve data version conflicts 118 in a manner that is consistent with the inference drawn from the observed memory access pattern.

As a fourth variation of this third aspect, an association 208 between a data item 108 and a selected data version conflict resolution technique 316 may be inferred by inspecting a workload 210 that utilizes the data item 108. Analysis of the workload 210 may reveal the usage of the data item 108 by the workload 210, which may enable an inference of the data version conflict resolution technique 204 to be used for data version conflicts 118 involving the data item 108. The inference may enable the establishment of an association 208 between the data item 108 and a selected data version conflict resolution technique 316 that resolves data version conflicts 118 consistent with the manner in which the workload 210 utilizes the data item 108.

In a third example scenario 810 of FIG. 8, a workload 210 utilizes a data item 108, and interacts with a data item 108 comprising an array. The workload 210 interacts with the data item 108 via a script 812 (e.g., via an access function), which indicates conditions in which the workload 210 accesses the data item 108, e.g., a condition that a request to add a value to the array is only fulfilled if the value is larger than all values currently in the array; requests to add a value that is not larger than the maximum value in the array are refused. An evaluation of the script 812 may enable an inference 814 that the workload 210 utilizes the data item 108 as an array of increasingly sorted values. A data version conflict resolution technique may be adapted to fulfill this same condition during a data version conflict 118 between two updates 116, i.e., by ensuring that each value is added only if exceeding the current maximum value in the array; that if both values satisfy the condition, the values are appended in ascending order; and if the values are equal, that only one value is added. The conditional resolution of a data version conflict 118 may be formalized in a logic 816, which may be generated ad-hoc for this workload 210, or may be selected as an existing logic 816 that has previously been formulated to address a similar condition in a previous workload 210. An association 208 may be established between the data item 108 and a stored logic data version conflict resolution technique 706 that utilizes the logic 816 generated in accordance with the inference 814.

As a fifth variation of this third aspect, the associations 208 may be established and stored in advance of a data version conflict 118 (e.g., at the time of creating the respective data items 108), and may be identified and utilized to resolve a subsequent data version conflict 118. Alternatively, an association 208 may be determined on an ad-hoc basis when a data version conflict 118 arises involving a data item 108 for which an association 208 has not yet been established. Any of the variations presented herein may be utilized (notifying a client 112 and requesting a selection; inferring based on the workload 210; etc.) to identify a selected data version conflict resolution technique 316, which is then invoked to resolve the data version conflict 118. Additionally, an association 208 may then be established between the data item 108 and the selected data version conflict resolution technique 316 to facilitate the resolution of additional data version conflicts 118 in the future.

Still further variations of this third aspect involve the manner in which associations 208 are established between data version conflict resolution techniques 204 in the data version conflict resolution technique set 202 and various portions of the data set 106.

As a sixth variation of this third aspect, the associations 208 may relate different portions of the data set 106 to different data version conflict resolution techniques 204; e.g., a first data item 108 of the data set 106 may have a first association 208 with a first data version conflict resolution technique 204, while a second data item 108 of the data set 106 may have a second association 208 with a second, different data version conflict resolution technique 204.

As a seventh variation of this third aspect, respective associations 208 may be differently configured to apply the data version conflict resolution technique 204 to different data item 108 in a different manner. For example, a first data item 108 and a second data item 108 may both be associated with a stored logic data version conflict resolution technique 706, but the association 208 with the first data item 108 may reference a first stored logic 218 and the second data item 108 may reference a second, different stored logic 218. As a result, the stored logic data version conflict resolution technique 706 applies a different stored logic 218 to each data item 108.

As an eighth variation of this third aspect, respective associations 208 may differ in granularity; e.g., as shown in the example scenario 200 of FIG. 2, a first association 214 may apply to all tables 212 of workload 210, while a second workload 210 may feature different tables 212 with different table-specific associations 214, and a third table 212 may feature attributes with different attribute-specific associations 214.

As a ninth variation of this third aspect, one or more data items 108 of a data set 106 may have associations 208 with multiple data version conflict resolution techniques 204. In some embodiments, the associations 208 and data version conflict resolution techniques 204 may be individually selected in different circumstances (e.g., a first association 208 to be used for a first type of data version conflict 118, such as a disagreement among the servers 104 of the server set 102 of the current value of a data item 108, and a second association 208 to be used for a second type of data version conflict 118, such as a disagreement among the servers 104 of the server set 102 as to whether or not the data item 108 exists0. In some embodiments, multiple associations 208 and data version conflict resolution techniques 204 be established for use in tandem (e.g., invocation of several data version conflict resolution techniques 204 to identify a consensus in the data version conflict resolution outcomes 206) and/or in a priority order (e.g., invoking a first data version conflict resolution technique 204, and either applying it if the first data version conflict resolution technique 204 produces a high-confidence data version conflict resolution outcome 206, or invoking a second data version conflict resolution technique 204 if the first data version conflict resolution technique 204 fails to produce a high-confidence data version conflict resolution outcome 206). In some embodiments, the particular data version conflict resolution technique 204 to be applied to a selected data item 108 may be specified by a client of the workload, e.g., in a prospective and/or ad-hoc manner. In some embodiments, the particular data version conflict resolution technique 204 to be applied to a data item 108 may be determined on an ad-hoc basis (e.g., an API may be called with the details of the data version conflict, and may therefore choose a data version conflict resolution technique). In some embodiments, the particular data version conflict resolution technique 204 to be applied to a data item 108 may be inferred, e.g., based on the context in which the data version conflict 118 arises, such as the type of data version conflict 118 and/or the type of data item 108 involved in the data version conflict 118.

As a tenth variation of this third aspect, a joint association 214 may relate a data version conflict resolution techniques 204 to two or more data items 108 that may be involved together in a data version conflict 118 (e.g., an inconsistency that arises when the states of several data items 108 are considered together). The joint association 214 and associated data version conflict resolution technique 204 may be used for data version conflicts 118 arise that involve the several data items 108, but when a data version conflict 118 involves only one such data item 108, a second, non-joint association 214 and associated data version conflict resolution technique 204 may be utilized to resolve the non-joint data version conflict 118.

As an eleventh variation of this third aspect, the associations 214 between data items 108 and data version conflict resolution techniques 204 may be reevaluated, e.g., if such data version conflict resolution techniques 204 are based on an inference; if such data version conflict resolution techniques 204 fail to produce high-confidence data version conflict resolution outcomes 206; and/or if the data set 106 changes, such as a change of data type 216 for a data item 108. In such circumstances, the capability of a selected data version conflict resolution technique 316 to resolve data version conflicts 118 involving the data item 108 may be compared with the capabilities of other data version conflict resolution techniques 204 to resolve data version conflicts 118 involving the data item 108. In some embodiments, a client 112 may be notified of a deficiency of the selected data version conflict resolution technique 316 to resolve data version conflicts 118 involving the data item 108. In other embodiments, the selected data version conflict resolution technique 316 may be modified (e.g., updating a stored logic 218 to address data version conflicts 118 that have not been satisfactorily and consistently resolved); in other scenarios, the association 214 between the data item 108 and the selected data version conflict resolution technique 316 may be replaced by a second association 208 between the data item 108 and a different data version conflict resolution technique 204 that is likely to be more capable at resolving data version conflicts 118. In some embodiments, the modification and/or substitution may be preceded by a notification of a client 112, and optionally acceptance by the client 112; in other embodiments, the modification and/or substitution may be applied automatically. Many such associations 214 between data items 108 and data version conflict resolution techniques 204 may be established in accordance with the techniques presented herein.

E4. Detecting Data Version Conflicts

A fourth aspect that may vary among embodiments of the techniques presented herein involves the detection of a data version conflict 118 to be resolved through the invocation of a data version conflict resolution technique 204.

As a first variation of this fourth aspect, a variety of data version conflicts 118 that may arise among one or more data items 108 of the data set 106. As a first example, the data version conflict 118 may represent different values of a single data item 108, such as two different integer values that different masters 114 have requested to be written to a single integer field the data set 106, where all servers 104 of the server set 102 are expected to agree on a single value of the data item 108 at any particular time. As a second example, the data version conflict 118 may represent a different sequence of values, such as a first master 114 that requests a sequence of writes for a data item 108 such as (A, B, C, D) and a second master 114 that requests a different sequence of writes for the same data item 108 such as (A, C, B, D), and where all servers 104 of the server set 102 are expected to agree on a single sequence of values of the data item 108. As a third example, the data version conflict 118 may represent a presence or absence of a value, such as a first master 114 that accepts and initiates the insertion of a record into a table and a second master 114 that rejects and refuses to acknowledge the insertion of the record in the table, where all servers 104 of the server set 102 are expected to agree on whether or not the record exists. Alternatively, a first master 114 may initiate the deletion of an existing record in the table, and a second master 114 may refuse to acknowledge the deletion. As a fourth example, the data version conflict 118 may represent differences in the metadata of a data item 108, such as different masters 114 identifying different timestamps or formats of a data item 108, where all servers 104 are expected to agree on a consistent set of metadata for the data item 108. As a fifth example, the data version conflict 118 may involve two or more data items 108. In some cases, one or both of the data items 108 may be individually inconsistent, such as a first record that overwrites and corrupts a portion of a second record; in other cases, the data items 108 may be individually consistent, but the collection of data items 108 (either coexisting or consecutively existing) may exhibit a data version conflict 118, such as primary key value of a database table that is expected to be unique for all records, but where a first record created by a first master 114 and a second record created by a second master 114 both exhibit the same primary key value, thus violating the uniqueness constraint. These and other aspects of at least one data item 108 of a data set 106 may present a data version conflict 118 that is resolvable through the techniques presented herein.

As a second variation of this fourth aspect, the data version conflict 118 may be detected solely by an inspection of a data item 108 and one or more updates 116 of the data item 108 (e.g., a determination that different updates 116 of an integer are based on different initial values of the integer). Alternatively, the detection of the data version conflict 118 may include a review of metadata within the data set 106, such as constraints specified in the definition of a table, or a database schema specifying constraints to be applied to data items 108 of a data set 106 formatted in accordance therewith.

As a third variation of this fourth aspect, a data version conflict 118 may be detected in the context of one or more updates 116 received from one or more masters 114. As previously noted, the occurrence of a data version conflict 118 is unlikely to arise due to a sequence of uncommitted updates 116 arriving at a first master 114, since the master 114 may choose to accept or reject respective updates 116 by evaluating whether the update 116 is consistent with the current state of the data set 106 as known to the master 114. Rather, data version conflicts 118 arise when a first master 114 accepts a first update 116 and a second master 114 accepts a second update 116, where the coexistence of both updates 116 creates a data version conflict 118 involving at least one data item 108. Because the respective masters 114 have already accepted the update 116, and possibly have even committed the update 116 locally to the data set 106 and/or have propagated the update 116 to other servers 104, the data version conflict 118 may create discrepancies in the state of the data set 106 as viewed by different servers 104 of the server set 102.

As a first such example, data version conflicts 118 may be detected when a server 104 receives updates 116 of a single data item 108 from two or more masters 114, where the coexistence of such updates 116 violates a constraint on the data item 108, such as two simultaneous requests to set an integer to different values, when the integer is only permitted to have one value at a time. As a second such example, data version conflicts 118 may be detected when an update 116 received from a first master 114 and to be applied to a data item 108 conflicts with a previously received update 116 from a second master 114 involving the same data item 108, such as an update 116 from a first master 114 changing the value of an integer from 3 to 5 following a previous update 116 from a second master 114 that changed the value of the integer from 3 to 6. In this case, the updates 116 are not copending (e.g., concurrently propagating through the server set 102); rather, the previous update 116 has already been committed by at least some servers 104, and the first update 116 is pending after the commitment of the previous update 116, but the coexistence of both updates 116 in the data set 106 may create a data version conflict 118.

As a third such example, data version conflicts 118 may be detected when a first update 116 is received that could be applied to a first data item 108, while a second update 116 is pending or has been completed with respect to a second data item 108. While each update 116 may appear to be valid and not to raise a data version conflict 118 when viewed in isolation, a joint review of both data items 108 and the updates 116 applicable thereto may present a data version conflict 118, such as when a first record and a second record of a table share a value that is expected to be unique for each record.

In accordance with this variation, detection of a data version conflict 118 may occur during the receipt and processing of an update 116 that has previously been applied by a master 114 (optionally including the same master 114 that accepted the update 116, e.g., when a master 114 accepts an update 116 and then receives notification of a conflicting update 116 by another master 114). The detection of a data version conflict 118 may occur even by a non-master device, such as a server 104 or a client 112 that is not permitted to update one or more of the data items 108 involved in the data version conflict 118, but rather receives conflicting updates 116 of one or more data items 108 by different masters 114. The detection of the data version conflict 118 in the context of one or more pending updates 116 may prompt the invocation of a selected data version conflict resolution technique 316 associated therewith in accordance with the techniques presented herein.

As a fourth variation of this fourth aspect, a data version conflict 118 involving two or more updates 116 may be detected in a proactive manner, e.g., not while processing a particular update 116, but during an evaluation of the data set 106 to verify its internal consistency. That is, a server 104 (either a master 114 or a non-master server 104) may scan the data set 106 to verify that the servers 104 share a consistent view of the data set 106 (e.g., that all servers 104 agree on the value of an integer, the sequence of values in an array, and the existence or nonexistence of records in a table; or, at least, that the propagation of updates 116 from a first server 104 to a second server 104 are unlikely to create a data version conflict 118), and that consistency guarantees have been satisfied. Such evaluation may be performed, e.g., as a maintenance task, optionally prior to a checkpoint or backup process, or as a security task, optionally prior to committing a significant update 116. As an example, a table may exhibit a constraint that each record is to have a unique value for a particular attribute, such as an identifier. A first master 114 may choose a value for a first record after verifying that no other record is using the value, and may then commit the first record and propagate it across the server set 102. Concurrently, a second master 114 may choose the same value for a second record after also verifying that no other record is using the value, and may then commit the second record and propagate it across the server set 102. The coincident selection of the same value for both records may not be detected during the propagation of the updates 116, but may only be detected by a retrospective review of the integrity of the data set 106. In other scenarios, a proactive review of the data set 106 may enable a prospective detection of an emerging data version conflict 118. For example, a first, to-be-committed update 116 may be under evaluation by a first master 114, and it may be determined that commitment of the first update 116 is likely to raise a data version conflict 118 with a second update 116 previously committed by a second master 114. The detection of the data version conflict 118 in the context of one or more pending updates 116 may prompt the invocation of a selected data version conflict resolution technique 316 associated therewith in accordance with the techniques presented herein. Many such variations in the detection of data version conflicts 118 may be included in variations of the techniques presented herein.

E5. Resolving Data Version Conflicts

A fifth aspect that may vary among embodiments of the techniques presented herein involves the invocation of a data version conflict resolution technique 204 to resolve a detected data version conflict 118 involving at least one data item 108.

As a first variation of this fifth aspect, the resolution of a data version conflict 118 may be promptly initiated after its detection, such as promptly determining the data version conflict resolution technique 204; promptly invoking the data version conflict resolution technique 204 with the updates 116 comprising the data version conflict 118 to generate the data version conflict resolution outcome 206; and promptly propagating the data version conflict resolution outcome 206 to other servers 104 of the server set 102 to resolve the data version conflict 118. Prompt initiation of conflict resolution may reduce the impact of the data version conflict 118, including the undesirable propagation of divergent values of a data item 108 and the degree of rollback to be performed throughout the data set 106 and/or server set 102; to reduce the duration of the data version conflict 118, during which the involved data items 108 may be inaccessible and/or not amenable to updates 116; and/or may expedite the uniformity with which the server set 102 reconciles the divergent views of the data item 108. Alternatively, data conflict resolution may be staged, e.g., to invoke a set of data version conflict resolution techniques 204 to resolve a batch of data version conflicts 118, and/or to apply data version conflict resolution outcomes 206 in a batch to the data set 106. Such deferral may be desirable, e.g., if the data version conflict resolution techniques 204 are computationally intensive, such that it may be advantageous to apply conflict resolution during a relatively idle period of the server set 102, and/or to promote the availability of the data set 106, e.g., if resolving data version conflicts 118 involves isolating the data set 106 in a manner that reduces access, whereby the period of unavailability may be consolidated and/or scheduled. In some cases, the promptness and/or deferral of data conflict resolution may be dynamic based on a variety of factors, such as the extent and/or significance of the data version conflict 118; the number and/or significance of data items 108 involved in the data version conflict; and the current load of the server set 102.

As a second variation of this fifth aspect, the resolution of a data version conflict 118 involves identifying an association 214 between a data item 108 involved in the data version conflict 118 and a data version conflict resolution technique 204. In some scenarios, the data version conflict 118 may involve two or more data items 108 that are respectively have associations 208 with different data version conflict resolution techniques 204. The resolution of the data version conflict 118 may involve choosing among the associations 208 and the associated data version conflict resolution techniques 204. Such selection may be based, e.g., on the relationships of the data items 108 involved in the data version conflict 118 or a comparison thereof, e.g., which data item 108 appears to be the source of the data version conflict 118. As another example, a data item 108 may have associations 214 with different data version conflict resolution techniques 204 that are to be invoked in different circumstances, and the selection may involve determining the particular type of data version conflict 118 and choosing the applicable association 214 and data version conflict resolution technique 204.

As a third variation of this fifth aspect, a data item 108 may have associations 214 with multiple data version conflict resolution techniques 204 that are to be invoked in combination (e.g., invocation of several data version conflict resolution techniques 204 to identify a consensus in the data version conflict resolution outcomes 206) and/or in a priority order (e.g., invoking a first data version conflict resolution technique 204, and either applying it if the first data version conflict resolution technique 204 produces a high-confidence data version conflict resolution outcome 206, or invoking a second data version conflict resolution technique 204 if the first data version conflict resolution technique 204 fails to produce a high-confidence data version conflict resolution outcome 206).

As a fourth variation of this fifth aspect, a variety of data version conflict resolution outcomes 206 may be produced by a data version conflict resolution technique 204. For example, the data version conflict resolution outcome 206 may involve applying one update 116 and discarding a conflicting update 116; applying both updates 116 in a particular sequence; and/or applying an instruction that comprises an aggregation of the updates 116 (e.g., a counting integer with an initial value of 2 may be subjected to two updates 116 with respective values of 3 and 4, and the data version conflict resolution outcome 206 may involve setting the value of the data item 108 to the value 5).

As a fifth variation of this fifth aspect, an update 116 that is not selected in a data version conflict resolution outcome 206 may be handled in a variety of ways. In some cases, an unselected update 116 may simply be discarded; e.g., when a data version conflict 118 involves a disagreement over the current value of an integer, the data version conflict 118 may be resolved by instructing all servers 104 to set the value of the data item 108 to the value in the selected update 116, which overwrites any previously accepted and/or committed a non-selected value by some servers 104. In other cases, simply discarding a non-selected update 116 may leave the data set 106 in an inconsistent state and may not fully resolve the data version conflict 118, and the data version conflict resolution outcome 206 may include instructions to reverse the previously acceptance and/or commitment of a non-selected value by some servers 104. Such instructions may involve, e.g., deleting a data item 108 that was previously crated; recreating a data item 108 that was previously deleted; and/or modifying the value, format, or structure of a data item 108 to comply with the updates 116 in the data version conflict resolution outcome 206. In still other cases, a non-selected update 116 may not be discarded but may be stored, e.g., in an archive of unsuccessful updates 116, and/or may be automatically retried again at a later time.

As a sixth variation of this fifth aspect, a data version conflict resolution technique 204 may be applied within an isolation snapshot of the data set 106 (e.g., the data version conflict resolution technique 204 may be presented with a view of the data set 106 at the time the data version conflict 118 arose and/or was detected). Alternatively, the data version conflict resolution technique 204 may be applied to a live, dynamic version of the data set 106 (e.g., conflict resolution may be performed over a current and possibly changing view of the data set 106). In some embodiments, a data version conflict resolution technique 204 may be invoked on an ad-hoc basis, e.g., to evaluate and resolve an identified and currently pending data version conflict 118. Alternatively or additionally, a data version conflict resolution technique 204 may be invoked on a proactive basis, either in a retrospective manner (e.g., by scanning the data set 106 of a workload 210 to identify as-yet-undetected data version conflicts 118, and/or to examine pending transactions or activities to identify emerging instances of data version conflicts 118) and/or a prospective manner (e.g., evaluating a to-be-committed update 116 by a first master 114 that, if committed, is likely to raise a data version conflict 118 with a second update 116 previously committed by a second master 114).

As a seventh variation of this fifth aspect, during the pendency of a data version conflict (including a determination of the data items 108 involved in the data version conflict 118; the selection and invocation of a data version conflict resolution technique 204; and/or the propagation of a data version conflict resolution outcome 206), the server set 102 may restrict access to one or more data items 108 involved in the data version conflict 118, e.g., in order to avoid operations on an uncertain value of a data item 108 and/or the acceptance of additional updates 116 that exacerbate the data version conflict 118. Alternatively, the server set 102 may permit further access to the data item 108 while resolution of the data version conflict 118 is pending. Such access may involve, e.g., presenting one or more initial, uncertain, and/or tentative values of a data item 108; annotating the data item 108 with an indicator of the data version conflict 118; and/or notifying a requester of the data item 108 as to the resolution of the data version conflict 118, and, optionally, an updated state of the data item 108 following the resolution of the data version conflict 118.

As an eighth variation of this fifth aspect, the incidence of a data version conflict 118 and/or the determination of a data version conflict resolution outcome 206 may be disseminated among the servers 104 and/or presented to one or more clients 112 as notification of the incidence and resolution of data version conflicts 118. Such notifications may include an identification of the data item(s) 108 involved in the data version conflict 118; an initial state of the data item(s) 108; the updates 116 involved in the data version conflict 118, optionally including additional details such as the values, timestamps, and/or sources of the updates 116; the rationale in determining that the coexistence of the updates 116 presents a data version conflict 118 (e.g., a constraint on the data type of the data item 108 or a rule of a data set schema of the data set 106 that is violated by the coexistence of the updates 116); the data version conflict resolution technique (s) 204 selected and invoked to resolve the data version conflict 118; and/or the data version conflict resolution outcome 206 of the data version conflict 118. Notifications may be promptly disseminated as notifications; may be aggregated into notification batches; and/or recorded in a log or journal. Notification may enable the servers 104 to apply the data version conflict resolution outcomes 206 and/or may inform clients 112 of the incidence of data version conflicts 118. Notifications and/or logging may enable an administrator of the server set 102, the data set 106, the workload 210, and/or the client set 110 to determine the cause of the data version conflict 118, to verify the adequacy of the selected data version conflict resolution technique 204 and the data version conflict resolution outcome 206, and/or to reconfigure the server set 102, the data set 106, the workload 210, and/or the client set 110 to reduce the recurrence of such data version conflicts 118. In some scenarios, the data item 108 may be associated with a change log that indicates a sequence of states of the data log, and commitment of the update 116 may involve updating the change log to indicate the incidence and resolution of the data version conflict 118. In some scenarios, the data log may include only indications of pending and/or recently resolved data version conflicts 118; e.g., data version conflicts 118 may be removed from the log after resolution, after a certain duration following resolution, and/or after confirmation that the data version conflict resolution outcome 206 has propagated throughout the server set 102 and/or client set 110. Alternatively, the data log may include a historic record of data version conflicts 118 that are retained long after resolution and propagation of the data version conflict resolution outcome 206. Such retention may be advantageous, e.g., for diagnostic and/or forensic review. Additionally, workloads 210 and/or clients 112 that are interested in and/or subscribed to the data item 108 may be proactively notified of the resolution of the data version conflict 118 and/or the data version conflict resolution outcome 206. In some embodiments, the server set 102 may keep track of which clients 112 have recently accessed a particular data item 108 (e.g., since the first update 116 involved in the data version conflict 118), and may proactively and selectively notify such clients 112 of the data item conflict 118 and/or the data version conflict resolution outcome 206.

Figure 9:
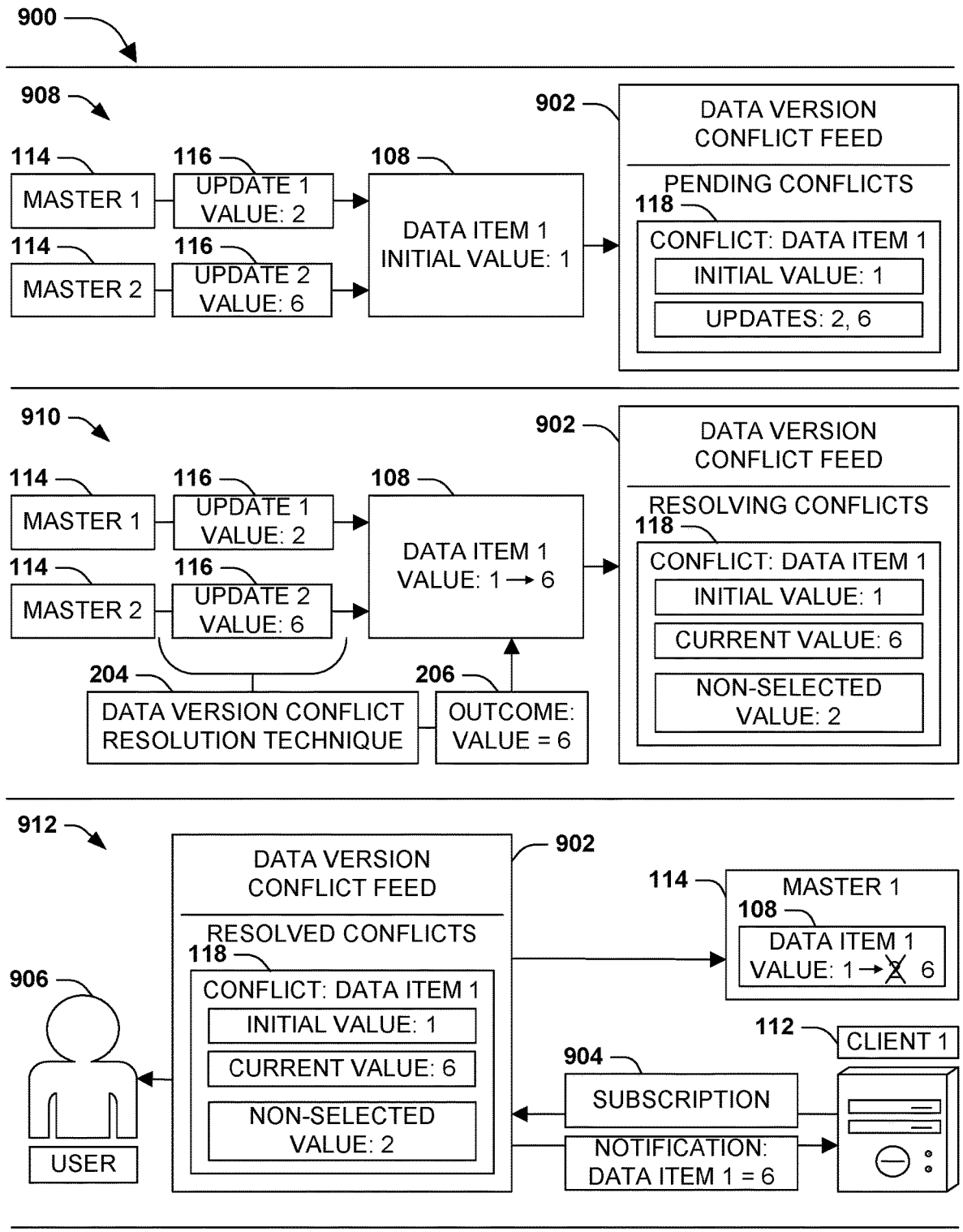
FIG. 9 is an illustration of an example scenario featuring a data version conflict feed that may be utilized to coordinate, document, and notify servers and clients of data version conflicts arising within the data set in accordance with the techniques presented herein.

FIG. 9 is an illustration of an example scenario 900 featuring a ninth variation of this fifth aspect, wherein the resolution of data version conflicts 118 of a data item 108 is recorded as a data version conflict feed 902. In this example scenario 900, at a first time 908, two masters 114 submit updates 116 that respectively update a data item 108 comprising an integer to two different values. A server 104 detected the coexistence of the updates 116 and the divergent versions of the data item 108 between the different masters 114. Even before data version conflict resolution has been initiated, a notification of the data version conflict 118 may be inserted into the data version conflict feed 902, optionally indicating the data item 108 involved; the initial value of the data item 108, and the competing values in updates 116 for which coexistence presents the data version conflict 118; and/or the status of the resolution of the data version conflict 118.

At a second time 910, a data version conflict resolution technique 204 may be identified and invoked to generate a data version conflict resolution outcome 206 (e.g., a selection of the value 6 as the current value of the data item 108 following resolution of the data version conflict 118). The notification in the data version conflict feed 902 may be updated to indicate that the data version conflict 118 of the data item 108 is undergoing resolution, e.g., that the data version conflict resolution outcome 206 has been determined but has not yet propagated throughout the server set 102.

At a third time 912, resolution may reach completion (e.g., propagating the data version conflict resolution outcome 206 to the first master 114 that accepted the non-selected update 116, enabling the first master 114 to apply the correct current value to the data item 108). The status of the data version conflict 118 in the data version conflict feed 902 may be updated to reflect the completion of the data conflict resolution. A user 906, such as an administrator, may review the data version conflict feed 902 to view a complete list of data version conflicts 118 in various stages of detection and resolution. Additionally, a client 112 having a subscription 904 to the data version conflict feed 902 (either in general or selective to the data item 108 involved in the data version conflict 118) may be sent a notification of the data version conflict 118 and the data version conflict resolution outcome 206. In this manner, the data version conflict feed 902 may serve to coordinate, document, and/or notify servers 104, clients 112, and users 906 of the series and status of data version conflicts 118 arising in the data set 106. Many such variations in the resolution of data version conflicts 118 may be included in variations of the techniques presented herein.

F. COMPUTING ENVIRONMENT

Figure 10:
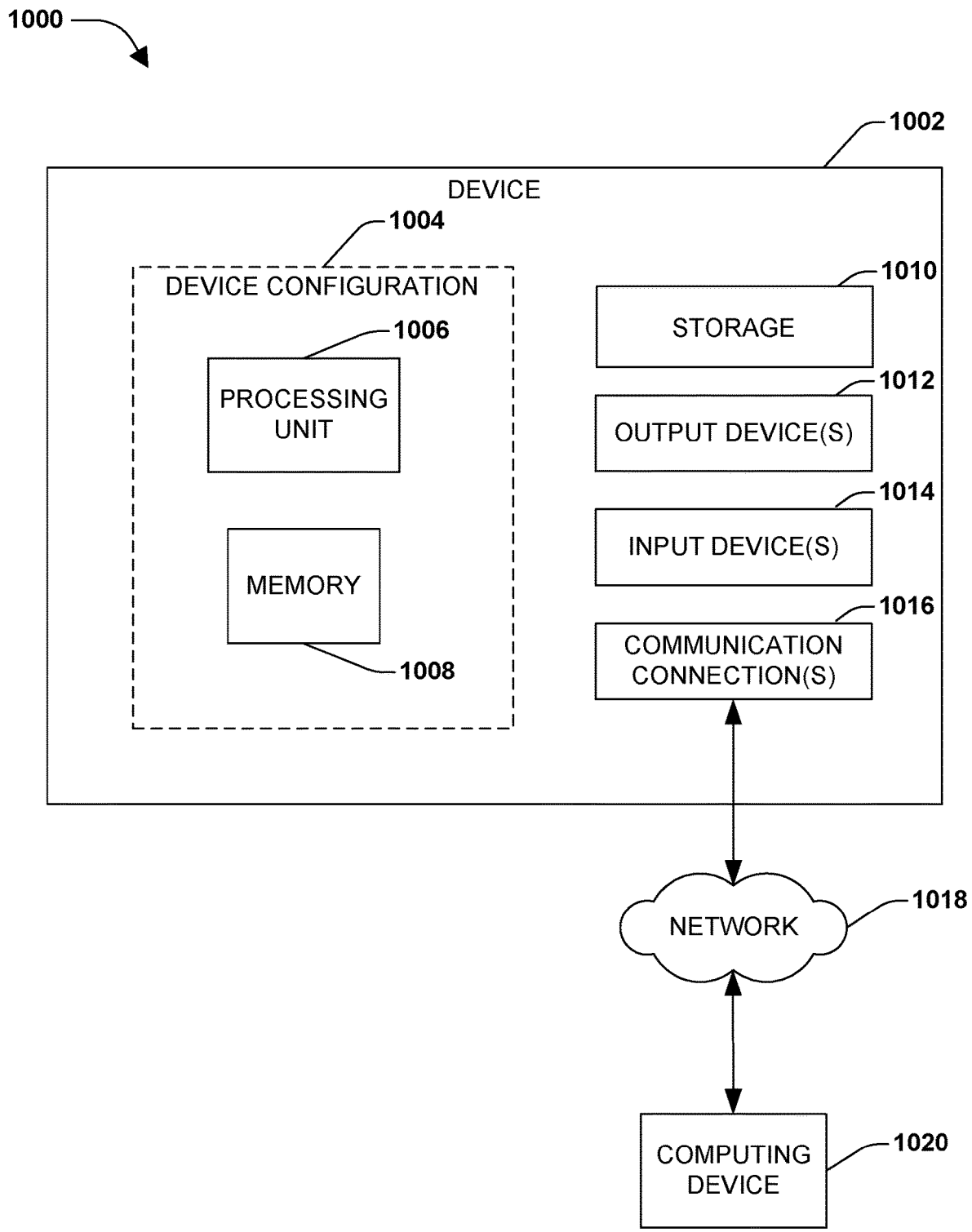
FIG. 10 is an illustration of an example computing environment wherein at least a portion of the currently presented techniques may be utilized.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example 1000 of a system comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer storage media. Computer storage media includes volatile and nonvolatile, removable and non-removable media implemented in any method or technology for storage of information such as computer readable instructions or other data. Memory 1008 and storage 1010 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1002. Any such computer storage media may be part of device 1002.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices.

Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

G. USAGE OF TERMS

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A server for a data set, the server comprising:
   a processor; and
   a memory storing instructions that, when executed by the processor, cause the server to:
      identify access patterns of workloads over a plurality of portions of the data set, the access patterns including patterns of value updates for data within respective portions of the dataset that are accessed by the workloads;
      associate respective portions of the plurality of portions of the data set with conflict resolution techniques selected from a set of conflict resolution techniques based on the identified access patterns;
      detect, in at least one data item of the data set, a data version conflict; and
      resolve the data version conflict, comprising at least two versions of a selected data item, by:
         identifying a first conflict resolution technique that is associated with an associated portion of the data set comprising the at least one data item, the first conflict resolution technique being associated with a first access pattern from the identified access patterns;
         invoking the first conflict resolution technique with the at least one data item to generate a conflict resolution outcome; and
         applying the conflict resolution outcome to the data set.

2. The server of claim 1, wherein associating respective portions of the plurality of portions of the data set with the conflict resolution techniques further comprises:
   receiving, from a user, a selection of the first conflict resolution technique from the data conflict for a selected portion of the data set; and
   associating the first conflict resolution technique with the selected portion of the data set.

3. The server of claim 1, wherein associating respective portions of the plurality of portions of the data set with the conflict resolution techniques further comprises:
   identifying a data type for a selected portion of the data set;
   identifying the first conflict resolution technique to resolve data version conflicts for the data type; and
   associating the first conflict resolution technique with the selected portion of the data set based at least in part on the data type.

4. The server of claim 1, wherein associating respective portions of the plurality of portions of the data set with the conflict resolution techniques further comprises:
   inspecting a workload to identify a usage by the workload of a selected portion of the data set;
   identifying the first conflict resolution technique to resolve data version conflicts involving portions of the data set that are used according to the usage of the workload; and
   associating the first conflict resolution technique with the selected portion of the data set at least in part on the usage of the workload.

5. A method of configuring a server of a server set to process a data set, the method comprising:
   executing, by a processor of the server, instructions that cause the server to:
      identify access patterns of workloads over a plurality of portions of the data set; the access patterns including patterns of value updates for data within respective portions of the dataset that are accessed by the workloads;
      associate respective portions of the plurality of portions of the data set with conflict resolution techniques selected from a set of conflict resolution techniques based on the identified access patterns;
      detect a data version conflict involving at least one data item of the data set; and
      resolve the data version conflict by:
         identifying a first conflict resolution technique that is associated with an associated portion of the data set comprising the at least one data item, the first conflict resolution technique being associated with a first access pattern from the identified access patterns;
         invoking the first conflict resolution technique with the at least one data item to generate a conflict resolution outcome; and
         applying the conflict resolution outcome to the data set.

6. The method of claim 5, wherein:
   the first conflict resolution technique further comprises a manual data version conflict resolution technique; and
   invoking the first conflict resolution technique further comprises:
      notifying a client of a first conflict resolution outcome option and a second conflict resolution outcome option for the data version conflict, and receiving, from the client, a selection of a selected conflict resolution outcome option as the conflict resolution outcome.

7. The method of claim 5, wherein:
the first conflict resolution technique further comprises a manual conflict resolution technique;
invoking the first conflict resolution technique further comprises:
  notifying a user of the data version conflict;
  receiving, from the user responsive to the notifying, a version conflict resolution logic; and
  invoking the version conflict resolution logic with the at least one data item of the data set to generate the conflict resolution outcome.

8. The method of claim 5, wherein:
the first conflict resolution technique further comprises a manual conflict resolution technique; and
invoking the selected conflict resolution technique further comprises:
  storing a notification of the data version conflict in a notification batch;
  transmitting the notification batch to a user; and
  receiving, from the user, a selection of a conflict resolution outcome for at least one data version conflict of the notification batch.

9. The method of claim 5, wherein:
the first conflict resolution technique further comprises a comparison of write priorities of updates to the at least one data item;
the data version conflict further comprises a coexistence of at least two updates to the at least one data item, respective updates having a write priority; and
invoking the first conflict resolution technique further comprises: identifying, among the at least two updates and according to the write priorities, a selected update that has priority over at least one non-selected update; and
applying the conflict resolution outcome further comprises:
  applying the selected update to the at least one data item; and
  discarding the at least one non-selected update of the data set.

10. The method of claim 9, wherein:
the write priorities further comprises a chronological sequencing of updates;
respective at least two updates further comprise a timestamp; and
identifying the selected update further comprises identifying the selected update according to the timestamps of the respective at least two updates and the chronological sequencing comprising the write priorities.

11. The method of claim 5, wherein:
associating respective portions of the plurality of portions of the data set with conflict resolution techniques further comprises:
  receiving a conflict resolution logic for at least one data item of the data set, and
  storing the conflict resolution logic in association with the at least one data item;
and
invoking the first conflict resolution technique further comprises: invoking the conflict resolution logic with the at least one data item to generate the conflict resolution outcome.

12. The method of claim 5, wherein:
the at least one data item further comprises a data type that indicates an update semantic for the at least one data item; and
identifying the first conflict resolution technique further comprises:
  identifying the data type of the data item; and
  applying updates to the data item in accordance with the update semantic of the data type of the at least one data item to resolve the data version conflict.

13. The method of claim 5, wherein executing the instructions further causes the device to:
generate a data version conflict feed;
responsive to determining the conflict resolution, add a version conflict notification of the data version conflict to the data version conflict feed; and
responsive to a request from a user to view the data version conflict feed for the data set, present the data version conflict feed to the user.

14. A method of causing a server of a server set to processing a workload of a data set, the method comprising:
executing, by a processor of the server, instructions that cause the server to:
  identify access patterns of workloads over a plurality of portions of the data set, the access patterns including patterns of value updates for data within respective portions of the dataset that are accessed by the plurality of workloads;
  associate respective portions of the plurality of portions of the data set with conflict resolution techniques selected from a set of conflict resolution techniques based on the identified access patterns;
  detect a data version conflict in at least one data item of the data set, the data version conflict comprising a coexistence of:
    a first update of the at least one data item by a first master of the server set, and
    a second update of the at least one data item by a second master of the server set;
  identify, from the set of conflict resolution techniques, a first conflict resolution technique that is associated with the at least one data item, the first conflict resolution technique being associated with a first access pattern from the identified access patterns;
  invoke the first conflict resolution technique with the first update and the second update to generate a conflict resolution outcome; and
  apply the conflict resolution outcome to the data set to resolve the data version conflict.

15. The method of claim 14, wherein detecting the data version conflict further comprises: detecting the data version conflict during an application of at least one of the first update and the second update.

16. The method of claim 14, wherein detecting the data version conflict further comprises: after the first update and the second update, scanning the data set to detect the data version conflict comprising the first update and the second update.

17. The method of claim 14, wherein:
invoking the selected conflict resolution technique further comprises: invoking the first conflict resolution technique with an isolation snapshot of the at least one data item of the data set in isolation of a workload; and
applying the conflict resolution outcome further comprises: applying the conflict resolution outcome to the data set currently in use by the workload.

18. The method of claim 14, wherein:
the at least one data item is also associated with a second conflict resolution technique; and execution of the instructions further causes the device to:
  determine that the conflict resolution outcome of the first conflict resolution technique fails to resolve the data version conflict;
  invoke the second conflict resolution technique with the at least one data item to generate a second conflict resolution outcome; and
  apply the second conflict resolution outcome to the data set to resolve the data version conflict in the at least one data item.

19. The method of claim 14, wherein:
the selected portion of the data set further comprises:
  a first data item that is associated with the first conflict resolution technique, and
  a second data item that is associated with a second conflict resolution technique; and
execution of the instructions further causes the device to identify the first conflict resolution technique from among the first conflict resolution technique and the second conflict resolution technique.

\* \* \* \* \*